INVENTORS
Ellis H. Born
Peter B. Burnham
Paul B. Wolfe

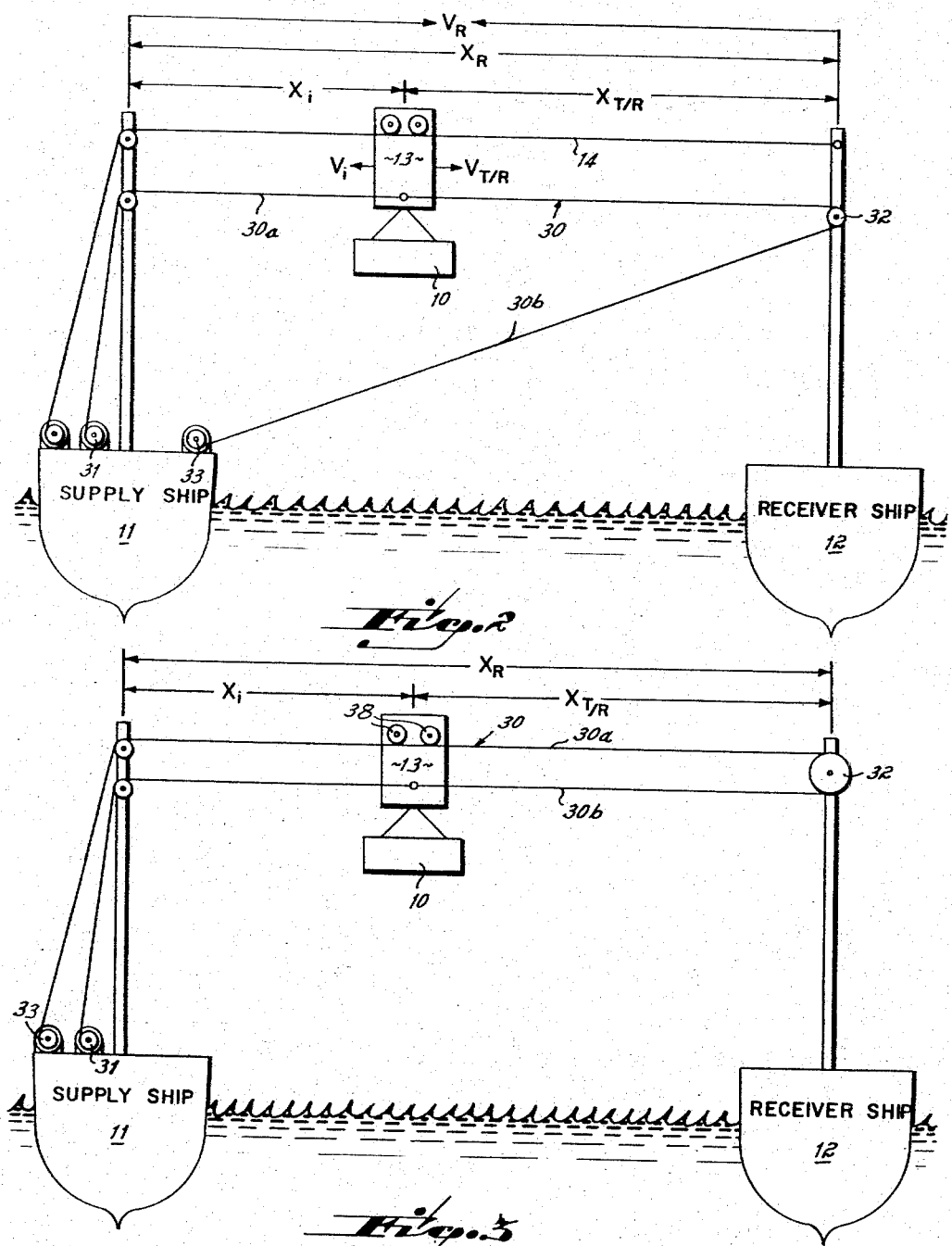

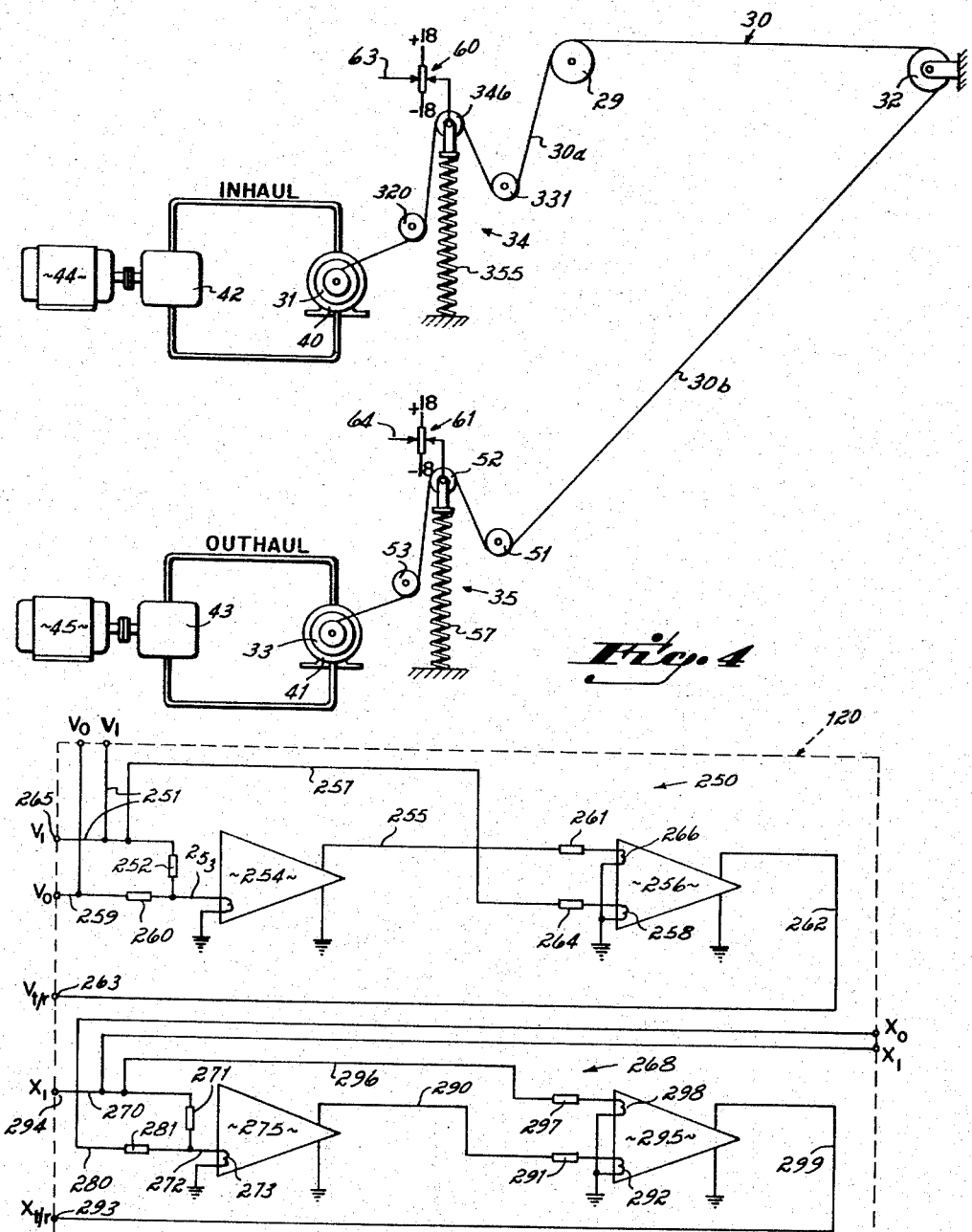

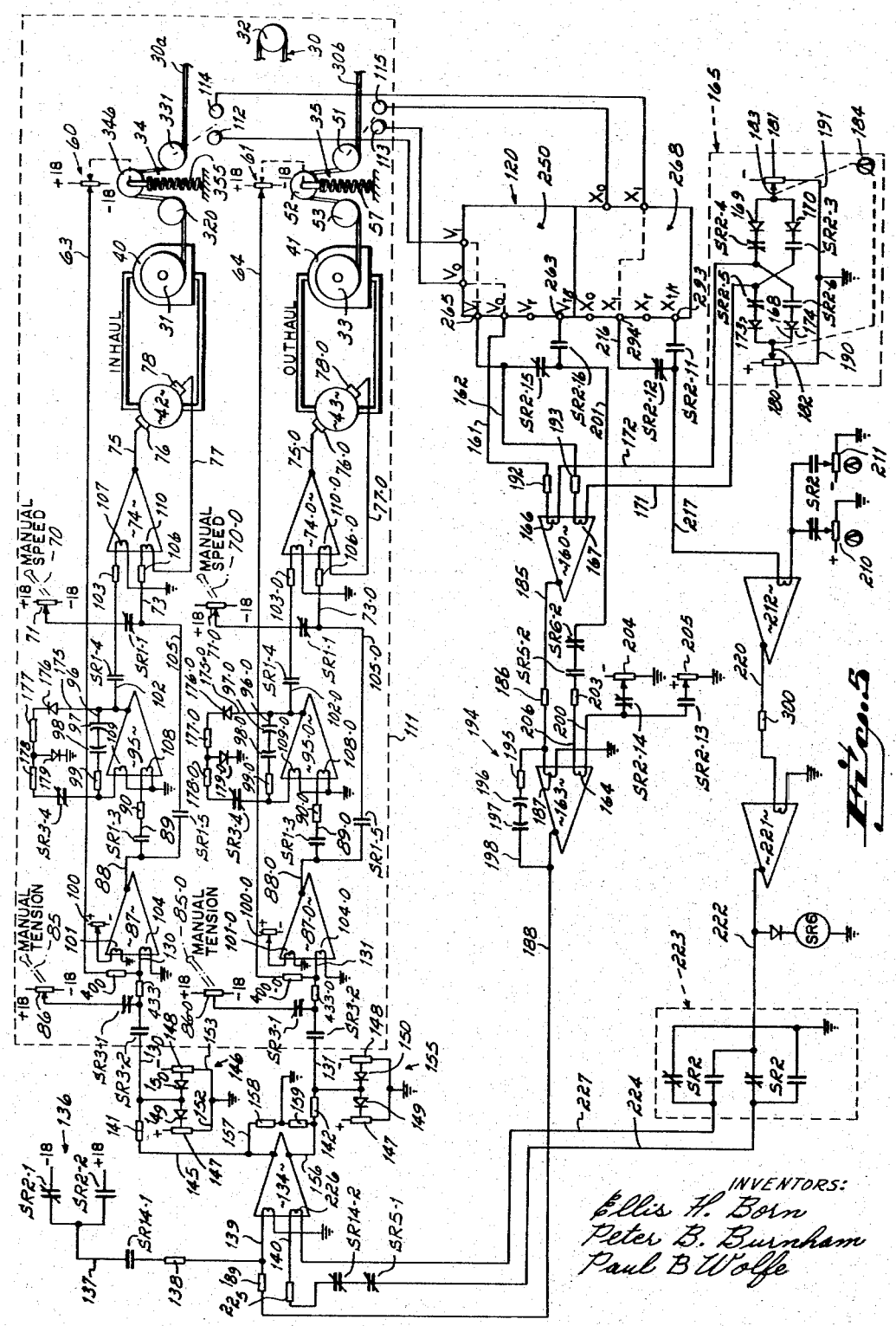

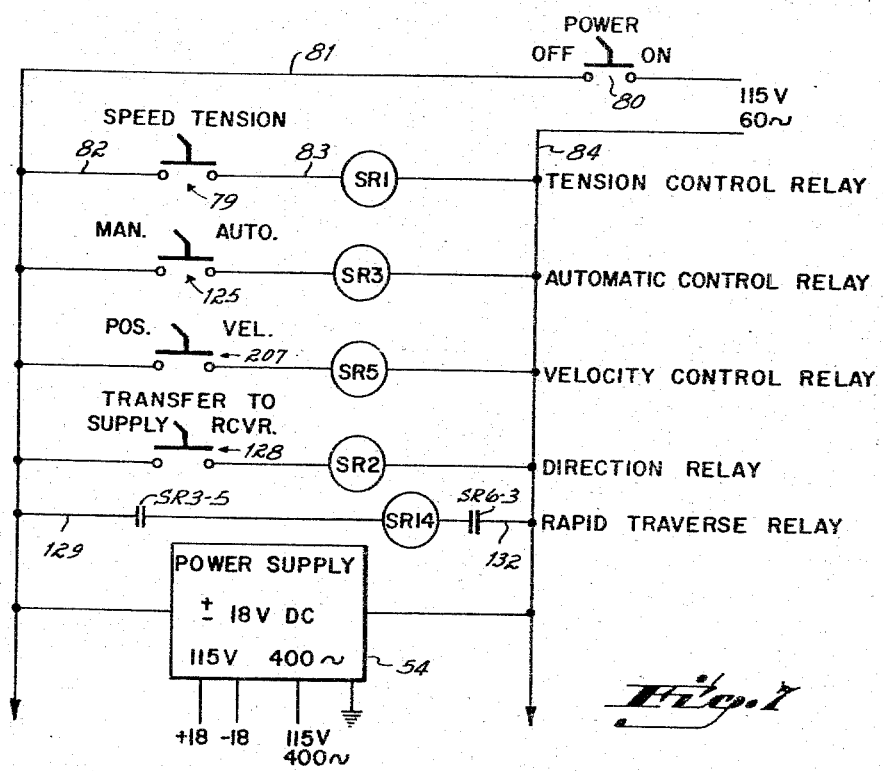
Fig. 7
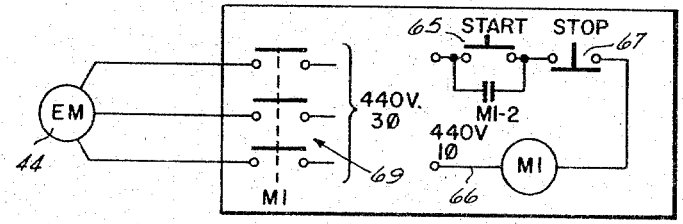
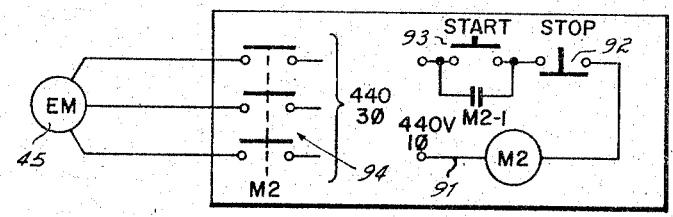
Fig. 8
INVENTORS
Ellis H. Born
Peter B. Burnham
Paul B. Wolfe INVENTORS
Ellis H. Born
Peter B. Burnham
Paul B Wolfe Jan. 2, 1968  E. H. BORN ET AL  3,361,080
METHOD AND APPARATUS FOR REPLENISHMENT AT SEA
Original Filed Feb. 11, 1965  7 Sheets-Sheet 7

INVENTORS
Ellis H. Born
Peter B. Burnham
Paul B. Wolfe 3,361,080
METHOD AND APPARATUS FOR REPLENISHMENT AT SEA Ellis H. Born, Columbus, Peter B. Burnham, Worthington, and Paul B. Wolfe, Dublin, Ohio, assignors to American Brake Shoe Company, New York, N.Y., a corporation of Delaware
Continuation of application Ser. No. 431,879, Feb. 11, 1965. This application Oct. 15, 1965, Ser. No. 496,408
26 Claims. (Cl. 104—114)

ABSTRACT OF THE DISCLOSURE

A method and apparatus for transferring articles between two moving ships at sea. The apparatus comprises a pair of winches on a supply ship and a cable which extends from one winch to a receiver ship and back to the other winch. In operation, the apparatus maintains a constant tension on the cable and superimposes upon the tension control signal automatic position and velocity control signals so as to move the cable and an attached trolley at a preset velocity to a predetermined position relative to the target ship.

---

Figure 1:
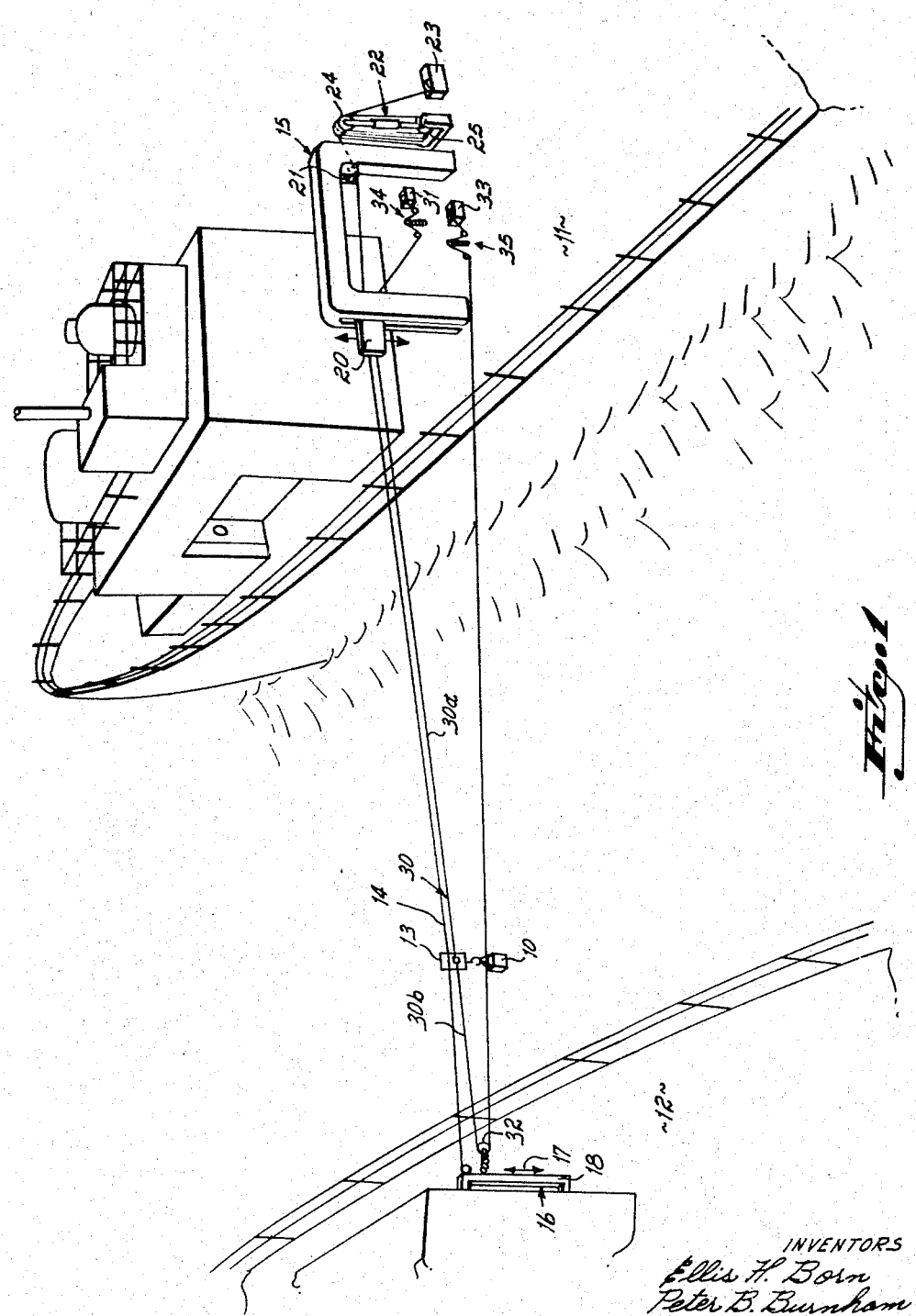

This application is a continuation of our copending application Ser. No. 431,879, filed Feb. 11, 1965, and now abandoned.

This invention relates to a method and apparatus for transferring articles between ships at sea and more particularly to a system for velocity and position control of the transfer trolley between the ships.

Generally, transfer between ships at sea has been traditionally accomplished with either a housefall or a highline rig although other rigs have been available. Regardless of which was used, the control has always been manual and operated by a seaman or seamen on the supply ship. In the event of rough seas, transfer was impossible using these conventional manually controlled systems because, roll, pitch, yaw, ship separation and shear, all complicated the problem of maintaining control of the trolley to the extent that it was nearly impossible to prevent the trolley from destroying itself against one of the replenishing ships or from dumping its load in the sea. Even in mildly rough seas it was not unusual to lose up to 30% of the materials overboard during the transfer operation.

For the seamen, who manually controlled the winches, the problem was to prevent the transfer line from breaking as the two ships rolled in opposite directions or from dipping into the sea as the two ships moved toward one another. Complicating this problem still further was the fact that the two ships rolled at different and variable frequencies and were simultaneously pitching, yawing and constantly changing course. With these variables in mind, the seaman's job was to manually control the winches so as to maintain a predetermined tautness in the line. Oftentimes, both winches were simultaneously required to take in line in order to keep the line out of the sea as the two ships moved toward each other, or to simultaneously pay out line as the two ships moved apart in order to prevent the line from breaking. And, if this were not a sufficiently difficult problem this seaman was also required, during transfer of the trolley attached to the line between the ships, to further control the winches so that ultimately, one took in line as the other payed it out if a transfer of the trolley was to be effected. And to top off the problem the seaman was required to ease the trolley into the receiver ship without a collision even if the receiver ship was 300 feet away from the seaman and rolling toward the trolley at the time. In anything but relatively calm seas, transfer was substantially impossible because of human limitations in the ability to simultaneously handle all of these complicating factors.

Recently complete replenishment of ships at sea has been proposed. This requires the handling of heavier and more delicate loads than have ever heretofore been attempted. As an example, ammunition having delicate electronic gear must now be transferred and replenished. This has required a new approach to the problem if a high percentage of the cargo is not to end up in the sea or be damaged by high impact landing shock.

It has, therefore, been an objective of this invention to provide a control system for the transfer of articles between ships at sea which eliminates the danger of loss of men and materials during transfer, and which is capable of operation under rough sea conditions so that complete replenishment of ships at sea is a practical reality.

Another objective of this invention has been to provide a transfer control system which enables articles to be transferred between ships in relatively rough seas without the danger of violent collision between the articles being transferred and the ship upon which the article is to be received.

Yet another objective of this invention has been to provide a constant tension winch control system which eliminates the necessity for skilled seamen on the winches and which is capable of operation by relatively unskilled personnel, to safely and efficiently transfer articles between ships at sea.

Another objective of this invention has been to provide an automatic transfer system in which the control system automatically compensates for ship movement so that the landing velocity of the trolley may be completely and automatically controlled irrespective of ship movements. Otherwise expressed, this invention permits constant velocity of the transfer trolley relative to the receiving ship so that the speed at which the trolley or carriage enters the receiving head may be accurately controlled irrespective of the receiving head movement at the time.

The apparatus of this invention which accomplishes these objectives may be envisioned as a complete system for controlling the speed and direction of rotation of a pair of winches, one an outhaul winch and the other an inhaul winch. Both of the winches are located on a single supply ship and carry a line which extends from one winch to a receiver ship and back to the other winch on the supply ship.

The system is operable to automatically maintain a predetermined tension on the lines throughout the transfer operation irrespective of the motion of the two ships. This is accomplished by actually measuring the tension on the two lines by means of tension measuring cells or transducers and providing feedback signals from the transducers operable to control the two winches so as to maintain the set tension. While this tension is maintained, a trolley velocity signal may be superimposed on the winch control so as to effect a transfer of the trolley between the ships. Since the set tension is maintained at all times during transfer, there is no danger of the trolley being dumped in the sea or the line tensioned to the breaking point.

This invention also envisions and incorporates additional refinements into the system. One of the refinements is a fully automatic control operable to transfer the trolley at rapid traverse from the sending ship toward the receiving ship until the trolley starts to close with the receiving ship at which time the velocity of the trolley relative to the receiving ship is slowed to a preset velocity. The trolley then moves at slow velocity to a target point which may be the receiving head of the receiver ship or may be a point as much as ten feet from the receiving ship. The system is then operable to maintain the trolley on the target point indefinitely without any attention while the trolley load is removed.

One of the advantages of using a tension measuring cell or transducer to measure tension in the transfer cable 30 is that it inherently provides a mechanical storage medium for a certain minimum amount of cable in addition to serving as a means of generating an electrical signal representative of the tension in the cable for purposes of feedback into the electrical control system. This storage, in turn, provides a built in time lag in the system, i.e., a period during which the hydraulic winch control pumps may start up or stop without varying the tension in the transfer line beyond permissive limits. Since this hydraulic system reaction time is approximately .1 to .2 second, this storage capacity is required in any operable automatic transfer control system.

One advantage of this invention is the reduction it achieves in the impact force between the transfer trolley and the receiving ship while still retaining a high average transfer speed. This system incorporates means operable to slow down the trolley to roughly 10% of its maximum speed just prior to the trolley meeting the receiving head. Since the impact energy is a function of the square of the transfer velocity, speed reduction to 10% of regular transfer velocity results in a reduction of the shock impact energy to as little as 1% of that which it would have if the transfer velocity were maintained until the trolley reached the receiving head.

Figure 9:
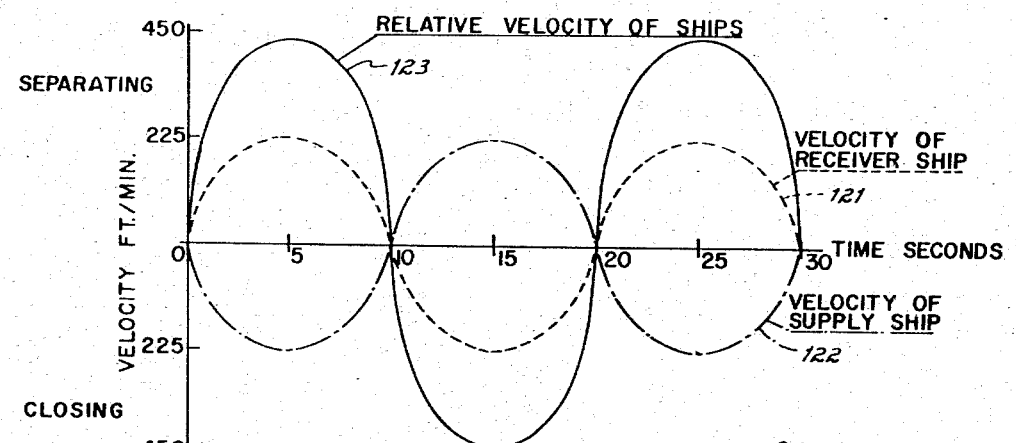
Figure 10:
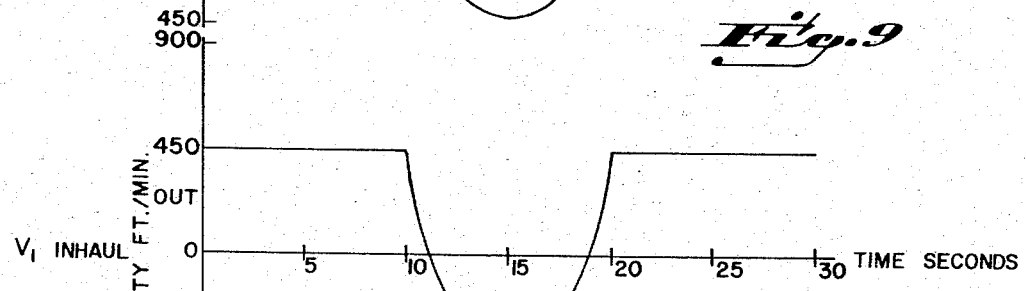
Figure 11:
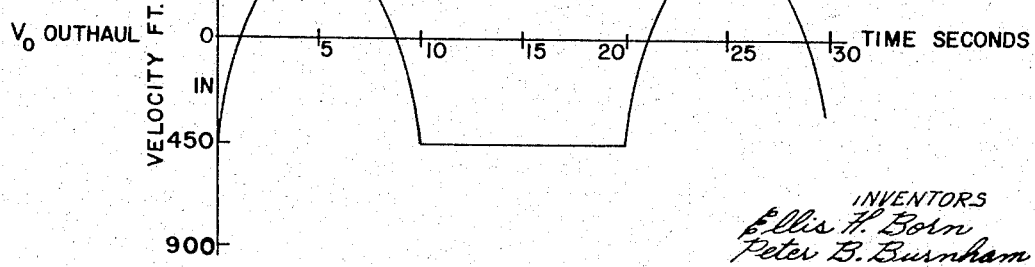
Figure 12:
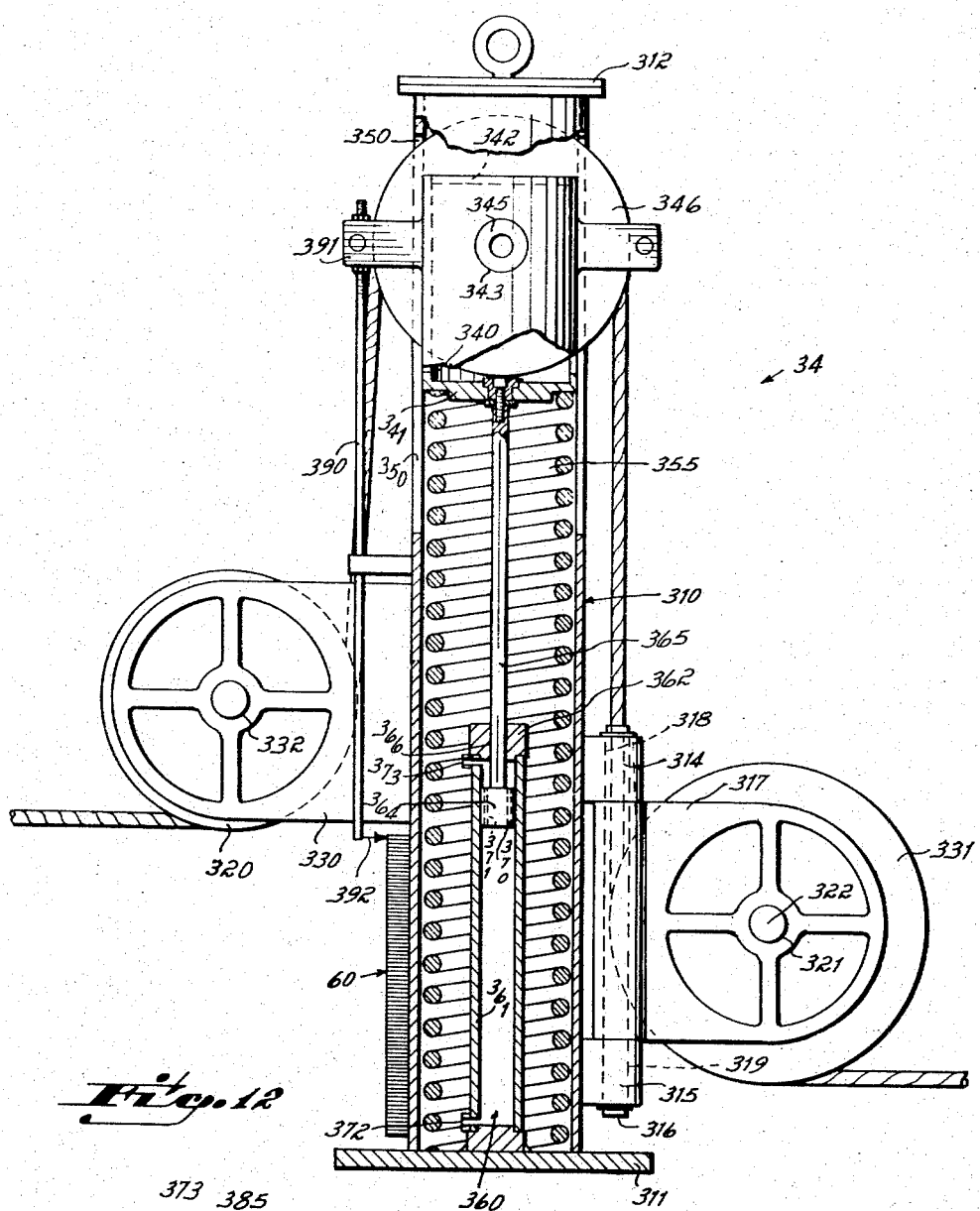
Figure 13:
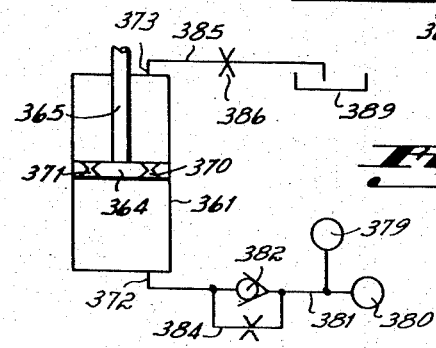

These and other objects and advantages of this invention will be more readily apparent from a description of the drawings in which:

FIGURE 1 is a perspective view of a high line rig extending between a supply ship and a receiver ship, FIGURE 2 is a diagrammatic illustration of a high line rig extending between two ships, FIGURE 3 is a diagrammatic illustration of a housefall rig extending between two ships, FIGURE 4 is a diagrammatic illustration of the mechanical and hydraulic networks used in effecting movement of the inhaul and outhaul winches, FIGURE 5 is a diagram of the electrical control circuit used to control the hydraulic pumps which in turn control the hydraulic winch motors, FIGURE 6 is a diagram of the electrical circuit of the signal analyzer, FIGURE 7 is a diagram of the electrical relay control circuit, FIGURE 8 is a diagram of the electric motor control circuit of the system, FIGURE 9 is a graphic representation of ship velocities and the resulting relative velocities of the ships, FIGURES 10 and 11 are graphic representations of the inhaul and outhaul winch velocities respectively, FIGURE 12 is a side elevational view, partially in cross-section of a transducer used in the control system, FIGURE 13 is a hydraulic circuit diagram of the transducer damping dashpot.

Referring to FIGURE 1, there is illustrated a high line rig for transferring articles 10 from a supply ship 11 to a receiver ship 12. During transfer, the article 10 is supported upon a trolley 13 which is in turn supported from a high line 14. The line 14 extends between a conventional M-frame indicated generally by the numeral 15 on the supply ship 11 and a vertically adjustable carriage 16 on the receiver ship 12.

As indicated by the arrow 17, the carriage 16 of the receiver ship is movable vertically within a vertical trackway 18. Vertical displacement of the carriage 16 within the trackway allows the articles 10 to be lowered onto the deck of the receiver ship after the article has been transferred from the supply ship, or alternatively, allows the article to be lifted to a transfer position from the deck if the article is to be transferred from the receiver to the supply ship.

For the same reason, i.e., raising and lowering of transferred articles 10 to and from the deck, the supply ship M-frame 15 includes a vertically adjustable carriage 20 which includes at least one pulley 29 (FIG. 4) over which the high line 14 passes to a rear pulley 21 on the M-frame. From the rear pulley 21, the high line makes several wraps around a tensioning ram 22 and subsequently passes to a high line winch 23. The tensioning ram 22 is used to maintain a fixed tension in the high line 14. The line 14 makes several wraps between an upper set of pulleys 24 on the tensioning ram and a lower set of tensioning pulleys 25. The shafts upon which these pulleys are mounted are biased apart by means of a conventional ram and fluid accumulation system. If the high line goes slack, as it might upon the two ships approaching each other, the bias between the two sets of pulleys 24, 25 forces them apart so as to take up the slack line. On the other hand, if the two ships pull apart, the high line will go taut and pull the two sets of pulleys together as the line is pulled off of the tensioning ram. When the pulleys 24, 25 move a predetermined distance apart or move toward each other a predetermined distance, a seaman operating the winch 23 causes it to let out or take in line so as to maintain the tension within predetermined limits.

The winch 23 may, if desired, be controlled automatically rather than by a seaman. If automatic highline tension is desired, movement of the pulleys 24, 25 is monitored by a potentiometer having its wiper connected to the movable set of pulleys and its coil fixed such that the potentiometer output voltage is a measure of pulley displacement. The potentiometer signal is then used as a command signal to a control amplifier of the control system to the winch 23. The winch 23 control system is otherwise identical to that shown and described hereinafter for control of either the inhaul or outhaul winch and includes a servo controlled hydraulic pump and motor with a hanger position feedback loop to the control amplifier.

Transfer of the trolley 13 over the high line 14 is controlled from a transfer line 30 which extends from an inhaul winch 31 on the supply ship through the M-frame carriage 20 to and around a pulley 32 on the receiver ship back to an outhaul winch 33 on the supply ship. Between the inhaul winch 31 and the carriage 20, the line 30 passes through a tension measuring cell or transducer 34. Similarly, the line passes through another tension measuring cell or transducer 35 adjacent the outhaul winch 33. These transducers function to measure the tension in the inhaul stretch of the line 30a and the outhaul stretch 30b respectively, and transmit a signal to the control apparatus to maintain a preset tension as is more fully explained hereinafter.

As may be seen most clearly in FIGURE 2, the trolley 13 rides over and is supported from the high line 14 but is attached to the transfer line 30. Thus, as the winches 31, 33 operate to pay out line in one length of the transfer line 30 and take in line from the other length, the trolley is caused to move from one ship to the other.

Referring now to FIGURES 2 and 3, there is illustrated diagrammatically a high line and a housefall rig respectively. The FIGURE 2 illustration of the high line system essentially represents diagrammatically that which is illustrated in FIGURE 1 wherein a trolley 13 is supported from a high line 14 which extends between the supply ship and the receiver ship. The trolley is attached to the inhaul length 30a of the transfer line 30 so that as line is payed out by the inhaul winch and collected by the outhaul winch, the trolley is caused to move from the supply ship to the receiver ship. Reversal of the direction of rotation of the winches results in reversal of the movement of the trolley between ships.

As may be seen in FIGURE 3, the primary difference between the housefall rig and the high line rig resides in the absence of a high line. With this rig, the trolley 13 rides over the outhaul length 30a of the transfer line 30 and is attached to the inhaul length. When line is payed out by the inhaul winch 31 and collected by the outhaul winch 33, the trolley 30 and its freely rotatable pulleys 38 move over the outhaul length of the line from the supply ship to the receiver ship. Generally, the housefall rig is used only when light loads, such as personnel, are being transferred between the ships. Generally, if loads greater than 500 pounds are to be transferred, the high line rig is preferable because of its ability to support heavier weights without excessive catenary in the line between the ships.

Referring now to the diagrammatic illustration of FIGURE 4, it will be seen that the inhaul winch 31 and the outhaul winch 33 are both driven by a reversible rotary hydraulic motor 40, 41 respectively. Each of these motors is in turn driven from a variable volume hydraulic pump 42, 43 respectively. The pumps are conventional servo-controlled variable volume pumps driven from electric motors 44, 45.

Immediately after the transfer line 30 passes off of the inhaul winch 31, it passes through the transducer 34 by passing beneath a stationary pulley 320, over a vertically movable pulley 346, and beneath a fixed pulley 331. From the transducer 34, the line passes over the pulley 29 of the adjustable carriage 20, to and around the receiver ship pulley 32, and back to the transducer 35 adjacent the outhaul winch. In the transducer 35, the line passes beneath a stationary pulley 51, over a vertically adjustable pulley 52 and beneath a stationary pulley 53 to the outhaul winch 33. Both of the vertically adjustable tensioning pulleys 346, 52 are biased upwardly by compression springs 355, 57 respectively.

Vertical displacement of the tensioning pulleys 346, 52 is measured by a potentiometer 60, 61 respectively. In use, a preset tension in the form of a command voltage signal is set into the controls, as for example one thousand pounds of tension in the line 30. When there is a tension of one thousand pounds in both of the lengths 30a and 30b of the line 30, the potentiometers 60, 61 attached to the adjustable pulleys 346, 52 have a feedback signal output equal and of opposite polarity from the command voltage so that the feedback signals cancel the command signals. If the tensioning decreases in either of these lines, the pulleys 346, 52 move upwardly so as to cause a feedback voltage increase in the output leads 63, 64 of the potentiometer 60, 61 respectively. On the other hand, if the tension in the line 30 increases, the potentiometer voltage decreases with a resulting decrease in the feedback leads 63, 64. These feedback voltages from the potentiometers maintain a preset tension in the transfer line 30 as is explained more fully hereinafter.

*Transducers*

The transducers 34, 35 are operative to measure tension in the transfer cable and to convert the tension measurements into electrical signals of a magnitude directly proportional to the tension in the cable 30. They are also operative to store cable so as to give the hydraulic and electrical systems a reaction or lag time during which to react and correct for a change in cable tension. To illustrate this point, assume that the receiver ship suddenly moves away from the supply ship and in so doing throws a heavy shock tension load on the cable 30. The hydraulic pump 42 and the motor 40 are incapable of reacting instantaneously to this type of loading. In fact, a lag of .1 to .2 second is required in which to adjust the winch motor 40 speed once the tension change has been detected.

In the absence of this cable storing capability, the cable 30 could and would break before the winch motor 40 and the pump 42 could pay out line.

In reality, a sudden load placed upon the cable by ship movement is not the worst condition actually encountered. The condition which would most often result in cable breakage in the absence of this cable storage feature occurs when the trolley reaches the receiving head of a ship and is suddenly brought to a stop. At this time, the inertia of the winches is enough to break the line if there is not sufficient cable storage in the system to allow approximately .2 second for the winches to be brought to a stop.

The transducers 34, 35 also serve a third function; to dampen the resonance frequency of the system. Since the energy storing devices are located in the transducers at opposite ends of the cable 30, the system is a dynamic one which may very easily be set in resonance. Some mechanism must be provided to dampen the resonance frequency of the system. To this end, each of the transducers 34, 35 includes a hydraulic dashpot system.

Since both of the transducers 34, 35 are identical, only one, the inhaul transducer 34, is completely illustrated and described herein.

As shown in FIGURE 12, the inhaul transducer 34 includes a cylindrical tubular housing 310 welded or otherwise secured to a base plate 311 which is in turn secured to the deck of the supply ship adjacent the inhaul winch 31. The housing has a cover or cap 312 secured to its upper end. Welded to one side of the housing 310 is a pair of vertically spaced hinge brackets 314 and 315. Between these brackets 314, 315 a hinge pin 316 pivotally supports a pulley support block 317. This block includes a vertical aperture through which the hinge pin 316 extends. The ends of the hinge pin are supported within aligned vertical apertures 318, 319 of the brackets 314, 315 such that the block 317 is free for hinged or pivoted movement about a vertical axis.

The pulley block 317 is vertically slotted so as to accommodate a pulley 331. The pulley is rotatable upon a horizontal shaft 321 which extends between bearings located in the block 317 on opposite sides of the slot. Thus, the pulley 320 is rotatable upon a horizontal axis 322 and is pivotal about the vertical axis of shaft 316.

A second pulley support block 330 is welded to the housing 310 on the side opposite the brackets 314, 315. This block 330 is generally similar to the block 317 except that it is secured against pivotal movement about a vertical axis. Block 330 supports a pulley 30 for rotation upon a shaft 332 which extends between the slotted section of the block.

A third pulley support block 430 is vertically slideable within the tubular housing 310. This block includes a circular base plate 341 and top plate 342 spaced by a pair of spaced pulley support brackets 343. The spaced plates 341, 342 are of slightly less diameter than the internal diameter of the housing 310 so that the block 340 is vertically slideable therein.

The pulley support brackets of the support block 340 rotatably support a third pulley 346 which is journaled upon a horizontal shaft 345. The shaft 345 extends between and is supported in apertures 343 of the block 340. Since the pulley 346 is of greater diameter than the diameter of the housing 310, the housing is slotted as illustrated at 350 so as to permit the radial extremities of the pulley to extend through and move vertically within the slots 350.

The lower surface of the base plate 341 rests upon the upper end of a heavy compression spring 355, the lower end of which rests upon the top of base plate 311. Thus, the pulley support block must compress the spring 355 in order to move downwardly within the housing 310 from the position illustrated in FIGURE 12.

To dampen spring 355 vibration or resonance, a transducer dashpot 360 is located within the interior of the transducer. The dashpot includes a cylinder 361 and piston 364 having its rod 365 extending through a central aperture 366 in an upper end cap 362 of the cylinder. The upper end of the rod 365 is secured to the bottom of the pulley support block 340 such that the piston 364 must move vertically if the block 340 and pulley 346 are to move.

The dashpot piston 364 includes a pair of apertures 370, 371 through which fluid may pass from the upper end of the cylinder to the lower end upon vertical displacement of the piston. An inlet port 372 and an outlet port 373 are provided adjacent the lower and upper ends of the cylinder 361 through which fluid may pass into or out of the cylinder 361.

The dashpot hydraulic circuit is illustrated in FIGURE 13. As shown in this figure, the hydraulic circuit includes a pump 380 operative to supply fluid via a conduit 381 and check valve 382 to the lower end of the cylinder 361. Conduit 381 is provided with a pressure accumulator 379. A by-pass orifice 384 is provided around the check valve 382. The upper outlet orifice 373 of the cylinder 361 is connected via a conduit 385 and metering valve 386 to a tank or reservoir 389.

In operation, the pump 380 is driven by an electrical motor (not shown) whenever the control system power on switch 83 is closed. This pump thus maintains fluid flow in the dashpot hydraulic network whenever the winch control system is in operation. In the event of downward force upon the pulley 346, the piston rod 365 must move downwardly a distance equal to the vertical displacement of the pulley. To move downwardly, fluid must either be passed through the piston orifices 370, 371 from the lower end of the cylinder to the upper or the fluid must pass through the by-pass valve 384 to the accumulator 379. Alternatively, if the pulley 346 is to move upwardly, the piston rod 365 must also move upwardly. In this event, fluid must be passed through the orifices 370, 371 from the upper end of the cylinder to the lower or from the upper end of the cylinder through the metering orifice 386 to tank 389. These orifices are so dimensioned that the fluid flow required for vertical piston movement acts to dampen vertical displacement of the pulley support block 340 and attached pulley 346.

Referring back to FIGURE 12, it will be seen that the transfer cable 30 passes from the inhaul winch 31 to and beneath the vertically fixed pulley 320, up over the movable pulley 346, and downwardly beneath the pulley 331. Since the two lower pulleys 320, 331 are secured against vertical displacement and the upper pulley 346 is free to move vertically withint he housing 310 against the bias of spring 355 and dashpot 360, tension in cable 30 may be measured by the vertical displacement of pulley 346. In actuality, this tension is physically measured by displacement of a potentiometer support arm 390 secured to a bracket 391 which is in turn attached to the pulley support block 340. A wiper 392 of potentiometer 60 is secured to the lower end of the support arm 390 so that as the pulley 346 moves vertically, the wiper 392 moves the same distance. The voltage tapped from the coil of potentiometer 60 by the wiper 392 is a measure of the displacement of pulley 346 which is in turn a measure of the tension in cable 30.

Rather than using a potentiometer 60 to measure displacement of the pulley 346, a linear variable differential transformer (LVDT) may be substituted. The latter has the inherent advantage of no physical contact by the wiper with the coil. This is particularly advantageous in the environment of use of this system, because of its constant exposure to salt water. If a potentiometer 60 rather than a LVDT is used in the system, it must be encased in a sealed enclosure (not shown).

Control circuit

Referring now to FIGURES 5, 6, 7, and 8, there is illustrated an electrical circuit diagram showing the control circuit utilized to control the servo pumps 42, 43 and thus the winch motors so as to accomplish the objective of this invention. With the control illustrated in the electrical diagrams several different modes of operation of the winches are possible; specifically manual speed mode, manual tension mode, rapid traverse mode, velocity control mode, and position control mode.

Manual speed control involves manual input of a signal to pay out or collect line upon an individual winch. There is no synchronization or cooperation of the winches in the manual speed mode of control. It is utilized during rigging of the transfer line between the ships when line is simply payed out of the winch upon which it is stored and strung up between the ships. It is also useful if one of the winches is used to lift articles out of the hold of the supply ship. In both of these situations, there is no concern with the tension of the line on the winch.

Manual tension is used when a trolley is transferred between ships under manual control while a preset tension is maintained in the transfer line.

Under automatic rapid traverse, the trolley is caused to move from one ship toward the other at the fastest possible speed while a preset tension is maintained on the line. When the trolley nears the target ship, control is switched to either the automatic velocity mode of operation or the position mode.

In the velocity mode, the trolley moves relative to the target ship at a preset slow velocity until it engages the receiving head of the target ship. In the position mode of operation, the trolley is moved at a slow velocity from the transfer point from rapid traverse to position mode until the trolley reaches target position. This target position may be any distance from the target ship. The system is then operable to hold the trolley in the target position regardless of all ship movements.

Each of these different modes will now be considered separately.

Manual speed control mode

As explained hereinabove, the manual speed control mode of operation of the system is used only to pay out or take in line from the winches. When this mode of operation is in effect, there is no predetermined or preselected tension on the transfer cable. Therefore, this mode is used only in two situations; to lift articles out of the hold of the supply ship, or to pay out line from the winch and reel it in when the transfer cable 30 is initially rigged or unrigged between the ships.

The electrical motors 44, 45 for driving the inhaul pump 42 and the outhaul pump 43 and their control circuits are shown in FIGURE 8. The inhaul motor 44 is started upon actuation of manual start switch 65. This completes the circuit to the inhaul motor from a four hundred and forty volt source via lead 66, relay M1, normally closed stop switch 67, and the normally open start switch 65. A holding contact M1–2 of relay M1 is provided in a parallel circuit around start switch 65 so as to maintain the relay M1 energized after release of the start switch 65 by the operator. Upon energization of the relay M1, the contacts 69 of relay M1 are closed so as to complete a circuit to the three phase induction motor 44. This motor is then operative to drive the pump 42. The pump may or may not drive the inhaul winch motor 40, depending upon the pump hanger location. This location is in turn controlled by the complete electrical control system.

The electrical motor 45 for driving the outhaul winch pump 41 is actuated upon energization of the relay M2. The circuit to the relay M2 is completed from a four hundred and forty volt power source via lead 91, the normally closed stop switch 92, and the normally open start switch 93. A holding circuit, including a contact M2–1 is provided around the normally open start switch so that when the switch 93 is released by the operator, the holding circuit will maintain the relay M2 energized So long as this relay is energized, the contacts 94 of relay M2 remain closed so as to complete a circuit from a four hundred and forty volt power source to the three phase induction motor 45.

When the system is to be operated according to this mode, a speed control handle 70 is moved so as to give rise to a voltage output from a potentiometer 71. The magnitude of this signal and its polarity determines the volume and direction of fluid flow from the fluid pump 42 to the inhaul winch motor 40.

The signal from the potentiometer 71 passes through a normally closed contact SR1-1 of a tension control relay SR1 to a pump amplifier 74 via lead 73 and resistor 106. This amplifier 74 is a conventional magnetic amplifier. The output signal of the pump amplifier is transmitted via a lead 75 to a servo valve 76 of the pump 42. Simultaneously, a feedback signal is fed from a pump potentiometer 78 via a lead 77 to the pump amplifier 74. Thus, so long as the pump hanger is not in the position dictated by the position of the manual speed control handle 70, the feedback signal from the pump potentiometer 78 will differ in magnitude from the potentiometer 71 command signal so that there will be an output voltage from the pump amplifier 74 effective to move the servo valve 76 of the pump 42 and so effect a change in volume in the fluid flow between the pump 42 and the inhaul motor 40.

An identical manual speed control is provided to the outhaul winch 41. Similar components have been given identical numerals in the control systems to both the outhaul winch 33 and the inhaul winch 31, except that the outhaul winch system components are followed by the suffix 0.

*Manual tension control mode*

In the manual tension mode of control, the transfer cable is rigged between the supply ship and the receiver ship in the fashion illustrated in FIGURE 4. The principle of operation of this mode is essentially that when a greater tension is applied to the transfer cable 30 adjacent one winch, than that applied at the other winch, the line will be caused to move toward that one adjacent which the tension is the greatest.

Under manual tension control, a preselected tension as for example, of a thousand pounds, is maintained at both of the transducers 34, 35, adjacent the inhaul and outhaul winches respectively.

To initiate this mode of operation, a tension control relay SR1 is energized by manual selection of a switch 79 which completes a circuit from a one hundred fifteen volt power source (FIGURE 7) to the relay SR1 via the power on switch 80, leads 81, 82, the tension control switch 79, lead 83, relay SR1, and lead 84. A tension signal is then set in as an input upon actuation of a manual tension handle 85 (FIGURE 5).

Energization of the relay SR1 opens the normally closed contact SR1-1 in the lead from the manual speed control potentiometer 71 to the pump amplifier 74 so that no signal may be inserted as a command signal or input signal to the pump from this source during tension control. In this mode of control, two input signals are supplied to a tension amplifier 87; the first is from a tension setting potentiometer 100 to one winding 101 of the amplifier 87, and the second is from a tension control handle 85 of potentiometer 86. Both the control handle 85 and the control knob of potentiometer 100 are located at the operator's control panel.

If a two volt signal represents one thousand pounds of tension on the line, a two volt signal is supplied from the potentiometer 100 as an input to the tension amplifier 87 whenever one thousand pounds of tension is to be placed on the cable 30 at the inhaul transducer 34. This signal is operative to cause the inhaul winch to take in line until such time as the tension measuring potentiometer 60 of transducer 34 indicates that there is one thousand pounds of tension on the transfer cable 30 at the tension measuring transducer 34. It will so indicate in the form of a voltage output from the tension measuring potentiometer 60 equal in magnitude to the preset tension voltage signal from pot 100. This output voltage from the tension measuring transducer is effective to cancel the signal from the potentiometer 100 so long as the two are equal in magnitude. Should the tension decrease, however, as by the supply ship moving toward the receiver ship, the inhaul winch will take in line at whatever rate is required to maintain a two volt output from the tension measuring potentiometer 60. In addition to the signal from the tension setting pot 100, a second signal may be transmitted to winding 104 of the tension amplifier 87 to either increase or decrease the cable tension at the transducer 34. Whether it increases or decreases the tension depends upon whether this second signal is of the same or opposite polarity from the pot 100. This second signal is supplied from the potentiometer 86, through normally closed contact SR3-1 of relay SR3, through resistor 433 and lead 130 to winding 104.

The output signal from the tension amplifier 87 is fed via lead 88, the normally open contact SR1-3, lead 89, and through resistor 90 into one winding 108 of a tension compensation amplifier 95.

This amplifier 95, as well as the tension amplifier 87, is a conventional magnetic amplifier. However, the tension compensation amplifier 95 includes a dual gain control loop. One loop is via lead 96, capacitors 97, 98 and a resistor 99 to a second winding 109 of the amplifier 95. The second dual gain loop is via lead 175, through diode 176, resistors 177, 178 and a normally closed contact SR3-4 to the winding 109 of the amplifier 95. A diode 179 is connected to ground between the resistors 177 and 178.

The output signal from the tension compensation amplifier 95 is supplied as an output to the pump amplifier 74, this signal being supplied to the amplifier winding 107 via lead 102, through the normally open contact SR1-4, and resistor 103. In addition to this static gain loop for supplying a signal from the tension amplifier 87 to the pump amplifier 74 through the tension compensation amplifier 95, a dynamic gain loop is provided around the tension compensation amplifier via lead 105, through a normally open contact SR1-5, lead 73, and resistor 106 to the amplifier winding 110. This dynamic loop functions to minimize the phase lag of the signal from the tension amplifier 87 to the pump amplifier 74, and, thus, renders it more responsive to tension changes in the transfer cable.

The output signal of the pump amplifier 74 is supplied via led 75 to the servo valve 76 of the pump 42. As in the case of the manual speed control, a feedback signal from the pump pot 78 is supplied via lead 77 to the pump amplifier 74.

In the manual tension control mode of operation, a command voltage is preset in potentiometer 100. This command signal, representative of a preset cable tension, is supplied to the tension amplifier 87 and from there through the tension compensation amplifier 95 to the pump amplifier 74. The output signal from the pump amplifier 74 is supplied to the servo valve 76 of the pump 42 so that the pump hanger is moved to a position in which the fluid flows to the winch motor 40. If while the tension set pot 100 is preset for one thousand pounds of tension, a signal indicative of sixteen hundred pounds of tension at the inhaul winch is put into the potentiometer 86 by manual movement of handle 85, the motor 40 of the inhaul winch is caused to take in line until sixteen hundred pounds of tension is measured by transducer 34.

To effect transfer of the trolley 13 in the manual tension mode of control, a preset and identical tension is first manually set into the pots 100, 100-0. The signal to one of the amplifiers 87 or 87–0 is then increased or decreased by movement of one of the handles 85 or 85–0 so that a greater tension is called for at one of the transducers than at the other. The cable will then be reeled in by the winch at which the greater tension is commanded. In other words, with the tension as measured by the tension measuring transducer 35 of the outhaul winch greater than that of the transducer 34 of the inhaul winch, the outhaul winch will take in cable while the inhaul winch pays it out. Regardless of the direction of movement of the trolley, a preset tension, determined by the setting of the pots 100, 100–0 (as for example one thousand pounds of tension in the example), will be maintained at the minimum in the trolley transfer cable 30.

Automatic control

All of the control circuitry heretofore described is used for manual control of the winches, i.e., the winches are controlled at the winch control panel by actuation of the manual speed control handles 70 and 70–0 or the manual tension control handles 85 and 85–0. In the first instance, a preset tension is not maintained on the lines while in the second instance a minimum preset tension is maintained on the lines adjacent each of the winches. In addition to these modes of operation, automatic control is also provided.

When the system is set up for automatic control, any of three modes is selectable. They are rapid transfer, landing velocity control, and position control. All three modes are preset at the control panel so that all the operator or seaman need do after loading the trolley is select the direction of trolley movement and the transfer occurs automatically, first in rapid transfer and then in either velocity or position mode of landing.

Under rapid transfer mode of control, the trolley velocity is maximized within the physical capabilities of the winches. In velocity control, the velocity of the trolley relative to the target ship is the factor which is controlled and which remains constant. In position control, the system is operative to hold the trolley at any preselected distance (as for example, five feet) from the target ship.

The control circuitry which enters into the control function only during automatic control is located outside the portion of FIGURE 5 enclosed by dashed lines 111, while that portion of FIGURE 5 located within the dashed line is used in both the manual and automatic modes of operation.

Under automatic control, the command signal is supplied to a push-pull amplifier 134. This command signal is amplified and becomes the output in leads 145 to the inhaul winch tension amplifier 87 and in lead 156 to the outhaul winch tension amplifier 87–0. A divider circuit including leads 156 and 157 and a pair of equal resistors 158, 159 is connected to ground between leads 145 and 156 so that the command voltage in leads 145 and 156 is equal and of opposite polarity. The polarity of the input command signal to the amplifier 134 determines the polarity of the signal in the respective leads 145, 156. In any event, these signals are always equal in magnitude and opposite in polarity so that when supplied as command signals to the tension amplifiers 87, 87–0, they command a tension differential which in turn results in trolley movement.

Connected to the lead 145 between the push-pull amplifier 134 and the tension amplifier 87 is a voltage limiter 146, which determines the maximum and minimum tension commands. This function is accomplished by clipping any voltage over a preset maximum or below a preset minimum. The maximum signal clipper portion of the limiter 146 consists of a diode 149 and a preset pot 147, one side of which is connected to ground by a lead 152. Similarly, the minimum signal portion of the limiter 146 consists of a diode 150 and a pot 148, one side of the pot being connected to ground by lead 153.

A similar voltage limiter 155 is connected to lead 156 between the push-pull amplifier 134 and the tension amplifier 87 in the control circuit to the outhaul winch.

Rapid transfer mode of operation

In the rapid transfer mode of operation, both a preset tension command from potentiometer 100, 100–0 and a tension feedback from potentiometers 60, 61 are supplied to the tension amplifiers 87 and 87–0 respectively. These signals are required to maintain a preset cable tension at the transducers 34, 35 as the ships move relative to each other. In addition, equal magnitude and opposite polarity tension command signals are supplied from push-pull amplifier 134 to the tension amplifiers 87, 87–0. These latter signals are command signals and represent the difference between an acceleration signal from a signal source 136 and a velocity feedback signal from one of a pair of D.C. tachometers 112 and 113. The tachometers measure cable velocity and generate a signal proportional in magnitude to cable velocity at the inhaul winch 31 and the outhaul winch 33 respectively. The polarity of the signal from the tachometers 112, 113 is dependent upon the direction of winch rotation. Only one of the two signals from the two tachometers 112, 113 is used as a feedback at any one time. In other words, the tachometers feedback signals are used alternatively. The actual signal used as the velocity feedback to the push-pull amplifier 134 is determined by the fastest winch as is explained more fully hereinafter.

During rapid traverse of the trolley under automatic control, the position of the trolley must be known in order that the transition point from rapid transfer to either position or velocity modes will be effective at some preset point short of the receiving head of the target ship.

For purposes of measuring the position of the trolley, potentiometers 114, 115 are driven directly from one of the pulleys 331, 51 of each of the transducers 34, 35. Thus, it is always possible, by means of these potentiometers 114, 115 to tell how much line has been payed out or taken in from each of the winches 31, 33.

The signals from potentiometers 114, 115 and tachometers 112, 113 serve as inputs to a signal analyser 120. The signal analyser is shown in block form in FIGURE 5 for purposes of clarity and is completely but separately illustrated in FIGURE 6.

Referring to FIGURE 2, it will be seen that the position of the trolley relative to the supply ship is easily measured since this is simply the amount of transfer cable 30 payed out by the inhaul winch as measured by the potentiometer 114 during trolley movement. Similarly, the distance between the ships is easily measured since this is equal to $$\frac{X_i + X_o}{2}$$

where $X_i$ equals the amount of line payed out by the inhaul winch and $X_o$ equals the amount of line payed out by the outhaul winch. The distance between the trolley and the receiver ship $X_{t/r}$ may then easily be determined since it is equal to $X_r - X_i$ where $X_r$ equals the total distance between the ships and $X_i$ equals the distance the trolley has moved from the supply ship as measured by the tachometer 114.

In a similar fashion, the relative velocity of the ships ($v_r$) may be figured as $$\frac{V_i + V_o}{2}$$

where $V_i$ is equal to the velocity of the inhaul winch as measured by the D.C. tachometer 112, and $V_o$ equals the velocity of the outhaul winch as measured by the tachometer 113. The velocity to the trolley relative to the receiver ship ($V_{t/r}$) is equal to $V_r - V_i$ where $V_r$ equals the velocity of the receiver ship relative to the supply ship and $V_i$ equals the velocity of the inhaul winch. In other words:

$$X_r = \frac{X_i + X_o}{2}$$

$$X_{t/r} = X_r - X_i$$

$$V_r = \frac{V_i + V_o}{2}$$

$$V_{t/r} = V_r - V_i$$

Referring back to FIGURE 5, it will be seen that $V_o$ and $V_i$ are used as signal inputs to the velocity control portion of the signal analyser 120. In the rapid transfer mode of operation of this system, these signals, $V_o$ and $V_i$, are used alternatively as feedback signals to control the winches. When the trolley reaches a predetermined point, as for example forty feet from the landing ship, the speed of the trolley is slowed so that it may be eased into the landing ship under either velocity or position control.

In this alternative use of the winch velocity signals, only that one of the winches which is operating at the greater speed is used as the feedback signal. The reason that only the higher speed is used as a reference is to maximize the rate of transfer of the trolley without exceeding the physical limits of either winch.

This problem can be more fully developed and explained with respect to FIGURES 9 through 11. Assume for the moment that both ships are individually capable of movement toward or away from some stationary point at a velocity of 225 feet per minute. Further, assume the most adverse situation possible, as pictured in FIGURE 9, in which both ships are rolling from side to side with a maximum velocity of 225 feet per minute and that the ships are 180° out of phase. In other words, the ships are rolling at the same frequency but 180° out of phase so that they achieve a relative velocity of twice their individual velocities, i.e., a relative separation velocity of 450 feet per minute if they are individually rolling at 225 feet per minute. This may be seen pictorially in the graph of FIGURE 9 where the velocity of the receiver ship is depicted by the dotted sinusoidal line 121, the velocity of the supply ship is depicted by the dot-dash line 122, and the composite or combined relative velocity is depicted by the solid sinusoidal line 123. As may be seen in this figure, the combined relative velocity of the ships thus reaches 450 feet per minute. The control system of this invention is capable of transferring articles between ships even when the relative velocity between the ships is equal to one-half the maximum speed of a single winch. To illustrate this point, assume that the maximum winch speed is 900 feet per minute. Since the cable between the ships is doubled (extends from one ship over to the other and back again) the sum of the winch speeds must be 900 feet per minute when the ships separate at 450 feet per minute.

Referring now to FIGURES 10 and 11, it will be seen that at zero relative velocity ($V_r$) of the ships, the inhaul winch pays out line at 450 feet per minute while the outhaul winch takes in line at 450 feet per minute in order to maintain the trolley moving away from the supply ship toward the receiver ship at 450 feet per minute. When the ships are separating at a relative rate ($V_r$) of 225 feet per minute, the outhaul winch is at zero velocity ($V_o$) and the inhaul winch is still paying out line at 450 feet per minute ($V_i$).

When the relative separation velocity of the ships goes above 225 feet per minute, the outhaul winch must reverse direction and pay out line while the inhaul winch continues to pay out line at 450 feet per minute. Thus, so long as the ships continue to separate, the inhaul winch continues to pay out line at its preset maximum limit, 450 feet per minute. It is up to the outhaul winch to make up the difference if and when the ships separate at a faster rate than the preset upper limit for the inhaul winch.

When, after ten seconds on the graph, there is no relative velocity between the ships, the inhaul winch continues to pay out line at the rate of 450 feet per minute and the outhaul winch takes it up at the rate of 450 feet per minute. Thereafter when the ships start to close or move toward each other, the outhaul winch speed is incapable of increasing so that it continues to operate at 450 feet per minute as the ships close. At this time, the inhaul winch must take up the slack and it does so by slowing from 450 feet per minute until it finally reaches zero velocity. Thereafter, as the closing velocity ($V_r$) of the ships goes above 225 feet per minute, the inhaul winch must reverse direction and take in line simultaneously with the taking in of line by the outhaul winch if they are to maintain a taut transfer line and continue trolley movement between the ships. When the ships finally reach their maximum relative closing velocity, after fifteen seconds on the graph, the relative velocity ($V_r$) reaches 450 feet per minute. At this time, both winches must be simultaneously taking in line at the maximum rate for which they are preset, 450 feet per minute, if the tension on the line is to be maintained. Thereafter, the inhaul winch speed again increases as the ship closing velocity decreases.

This example illustrates the point that by using the faster operating of the two winches as the feedback control, much higher transfer velocities may be achieved without exceeding the physical capabilities of the winches than would be possible if only the velocity of one winch or the combined winch velocities were used as a feedback.

Immediately upon the start of automatic control, the automatic control relay SR3 (FIGURE 7) is energized by manual actuation of switch 125. This results in the closing of the normally open contacts SR3-2, SR3-20 (FIGURE 5) in leads 130, 131. Upon the closing of these contacts, a circuit is completed from the push-pull amplifier 134 to each of the tension amplifiers 87, 87-0. Thus, any command signal input to the push-pull amplifier 134 will result in a corresponding signal being applied to each of the tension amplifiers 87, 87-0. The signals to the tension amplifiers 87 and 87-0 will, of course, result in a command signal to the pump amplifiers 74, 74-0 which in turn will be applied to the servo valves 76, 76-0 of the pumps 42, 43.

With the system in automatic control, the rapid traverse relay SR14 (FIGURE 7) is energized so as to close the contact SR14-1 (FIGURE 5). The circuit to relay SR14 is completed from lead 81, via lead 129, through normally open contact SR3-5 through relay SR14, through normally open contact SR6-3 and lead 132 to lead 84. The contact SR6-3 is closed upon actuation of position relay SR6 which remains energized so long as the trolley is more than a preset distance from the target ship as is explained more fully hereinbelow. Assuming that the transfer is to occur from the supply ship to the receiver ship, the direction relay SR2 (FIGURE 7) will be energized by manual setting of switch 128. If the transfer were to occur in the opposite direction, the direction relay SR2 would be de-energized by the setting of switch 128 at the supply ship position.

With the direction relay SR2 energized, the contact SR2-1 (FIGURE 5) opens and the contact SR2-2 closes so that a positive 18 volts is applied to the push-pull amplifier 134, from the power source 136 via lead 137, the normally open contact SR14-1, through resistor 138, and via lead 139. This 18 volt acceleration signal is applied to the push-pull amplifier in order that the trolley will be moved away from the sending ship as quickly as possible or at a maximum velocity so as to clear the sending ship.

It will be noted that the normally closed contact SR14-2 in lead 140 to the push-pull amplifier 134 is opened upon energization of the relay SR14. This precludes a position feedback signal reaching the push-pull amplifier during rapid traverse. This relay remains energized and the contact SR14–2 remains open so long as the system is in a rapid traverse mode of control.

During rapid traverse, a feedback signal representative of the winch velocities is supplied from the tachometers 112, 113 to the push-pull amplifier 134 in addition to the reference signal from the accelerative command source 136. This feedback signal opposed the signal from the source 136.

For the reasons described above in connection with the definition of the rapid traverse mode of control, only that signal from the faster operating of the two winches is used as a feedback to the push-pull amplifier 134. To accomplish this, and to gate the two signals from the tachometers 112, 113, the tachometers are each connected via leads 161 and 162 respectively, to one of the windings 166, 167 respectively, of a rapid traverse amplifier 160. The windings 166, 167 are connected via leads 172 and 171 respectively, to a gating device 165 which is operable to pass only that signal from the faster operating of the two tachometers 112, 113.

The gating device 165 consists of four contacts SR2–3, SR2–4, SR2–5, SR2–6 of the direction relay SR2, four diodes 173, 174, 169, 170 and a pair of potentiometers 180 and 181 connected so as to pass only the larger magnitude and proper direction signal. To this end, the wiper 182 of potentiometer 180 is connected to winding 166 via lead 172 of contact SR2–6, and diode 174. Similarly, the winding 166 is connected via lead 172, normally closed contact SR2–4 of relay SR2 and diode 169 to the wiper 183 of potentiometer 181.

The wiper 182 of potentiometer 180 is also connected to winding 167 of the rapid traverse amplifier 160 by lead 171, normally closed contact SR2–5 and diode 173. Similarly, the wiper 183 of potentiometer 181 is connected to winding 167 via lead 171, normally open contact SR2–3 and diode 170. The magnitude of the signals passed through the potentiometers 180, 181 may be preset by adjustment of a knob 184 mechanically connected to the wipers 182, 183 of each of the potentiometers 180, 181 respectively. One end tap of potentiometer 180 is connected to a positive 18 volt source and an end tap of potentiometer 181 is connected to a negative 18 volt source. The opposite end taps of both potentiometers are grounded via leads 190, 191 respectively.

Assuming that the transfer is occurring from the supply ship to the receiver ship, the relay SR2 will be energized and the normally closed contacts SR2–4 and SR2–5 of the gating device 165 will be open. Thus, in this direction of trolley travel, the tachometer signals must pass through one of the normally open contacts SR2–3 or SR2–6 in order to be effective as a feedback signal to the push-pull amplifier 134. The control knob 184 is adjusted at this time so as to set the maximum winch speed, in the example, 450 feet per minute. This represents a minimum voltage signal required to pass through potentiometer to ground. The signal must also be of a proper polarity to pass each of the diodes 174 and 170. By way of example, assume that a maximum winch speed of 450 feet per minute is represented by four volt feedback signals from the tachometers 112 and 113. The knob 184 of the potentiometers would be set for this speed and a signal of at least four volts from the tachometers would be required to pass through the potentiometers 180, 181. Any less voltage signal would be clipped at the potentiometers. Therefore, until one of the winches reaches this speed, 450 feet per minute, no feedback signal will reach the push-pull amplifier 134 and the 18 volt signal from acceleration power source 136 will continue to cause acceleration of the winches. When one of the winches reaches the preset speed, it will generate a signal of four volts. The polarity of the tachometer signal is dependent upon the direction of rotation of the tachometers. When the inhaul winch reaches 450 feet per minute, tachometer 112 will generate a four volt, negative polarity signal. This signal will pass through winding 167, contact SR2–3, diode 170, which is oriented to pass only a negative polarity signal as great or greater than the potentiometer 181 setting, and through the potentiometer to ground. This signal is then amplified and supplied as a bucking or feedback signal to the push-pull amplifier 134. The inhaul winch will then cease to accelerate and will hold this speed until conditions vary. One such variable condition would be if the ships start to close at a relative velocity of more than 225 feet per minute. At this time, the control would switch to the outhaul winch which would then generate a positive signal of at least four volts. This positive signal could then pass contact SR2–6 and diode 174 and take over control from the inhaul winch which slows so as to generate a signal from tachometer 112 of less than four volts. This latter signal is less than the minimum required to pass diode 170 and potentiometer 181 so that the control then switches to the faster winch which is now the outhaul. Thus, after acceleration to the maximum speed, one winch continues to operate at its maximum preset speed at all tmies during rapid traverse even though the ships may at times be moving toward and away from each other at faster relative speeds than this preset maximum.

The output signal from the rapid traverse amplifier 160 is transmitted to a velocity comparative amplifier 163 via lead 185 and a resistor 186. At this time, a position relay SR6 (FIGURE 5) is energized so that the contact SR6–2 is open and there is no signal fed into the winding 164 of the velocity comparative amplifier 163. The energization of relay SR6 is explained hereinafter. Suffice it to say that the relay is energized during rapid traverse. The signal supplied to the winding 187 of the amplifier 163 is again amplified and fed as an output via lead 188 through resistor 189 to the push-pull amplifier 134. This latter is the feedback signal during rapid traverse.

A gain control 194 including a resistor 195 and a pair of capacitors 196, 197 is provided in a gain compensation loop 198 around the velocity comparative amplifier 163.

When the trolley reaches a predetermined position relative to the landing ship as, for example, 20 feet from the target ship, the rapid traverse relay SR14 is de-energized. This occurs when the relay SR6 drops out. De-energization of relay SR6 causes the relay contact SR6–3 (FIGURE 7) to open and de-energize relay SR14.

As shown in FIGURE 5, the position error signal from the potentiometers 114, 115 is always transmitted to the signal analyser 120. From the signal analyser 120, a feedback signal representation of the position of the trolley relative to the receiving ship ($X_{t/r}$) or a signal representation of the position of the trolley relative to the supply ship ($X_i$) is transmitted to a position amplifier 212. If the direction relay SR2 is energized, the former signal, $X_{t/r}$, is transmitted via normally open contact SR2–11 and lead 217 to amplifier 212. If the direction relay SR2 is de-energized, the later signal, $X_i$, is transmitted via lead 216, normally closed contact SR2–12 and lead 217 to amplifier 212. Simultaneously, a position command signal from one of a pair of adjustable potentiometers 210, 211 is supplied to the position amplifier 212. The output signal from the amplifier 212 represents the error between the position at which the trolley is to stop at the target ship (for example, five feet from the target ship) and the actual position of the trolley relative to the target ship. The output signal of the position amplifier 212 is transmitted via lead 220 through resistor 300 to a second position amplifier 221. The signal from the second amplifier 221 is used to energize the relay SR6. So long as the position error signal from amplifier 221 is of a predetermined magnitude, it is operative to maintain the relay energized.

When the trolley arrives at a position approximately twenty feet from the target ship, the relay SR6 is de-energized. De-energization of this relay causes the rapid traverse relay SR14 to drop out upon opening of contact SR6–3 (FIGURE 7). When relay SR14 is de-energized, control is switched from rapid traverse control or mode of operation to either position or velocity control.

During rapid traverse mode of control, the position error from the position amplifier 221 is not transmitted as a feedback error signal to the push-pull amplifier because the normally closed contact SR14–2 is open. However, when the relay SR14 is de-energized, the contact SR14–2 closes so that the position error may at this time be transmitted to the push-pull amplifier 134 if the normally open contact SR5–1 of relay SR5 is closed. The relay SR5 (FIGURE 7) is a velocity position relay used to determine whether the velocity mode of control is operative or the position control mode.

Velocity control mode

During the velocity mode of operation, the trolley is moved at a preset speed from the position at which the rapid traverse relay SR14 drops out, to a position in which the trolley contacts the receiving head of the target ship. The actual velocity at which the trolley moves in the velocity mode is determined by the setting of a pair of potentiometers 204, 205, at the control panel.

Whether the trolley continues in the velocity mode of control after completing its rapid traverse between the ships or continues in the position mode of control is determined by the position of switch 207 (FIGURE 7). If the switch is open, the system will switch into position mode of control; if closed, it switches into the velocity mode by energizing the velocity control relay SR5.

When the trolley is moving from the supply ship to the receiver ship, with switch 207 in velocity mode of control, the direction relay SR2 is energized so that the velocity command signal from the potentiometer 205 is supplied as the command to the velocity comparative amplifier 163 via the normally open contact SR2–13, and lead 200 to the winding 164 of this amplifier 163. On the other hand, if the trolley is moving from the receiver ship toward the supply ship, the relay SR2 is de-energized so that the command signal to the velocity comparative amplifier is supplied from potentiometer 204 through the normally closed contact SR2–14 and lead 200.

The feedback signal, indicative of the actual speed of the trolley relative to the target ship is supplied to the velocity comparative amplifier 163 from the signal analyser 120 via either the normally closed contact SR2–15 or the normally open contact SR2–16 (depending upon the direction of trolley movement), lead 201, through the normally closed contact SR6–2 and normally open contact SR5–2, through resistor 203, and lead 206. So long as the amplitude of the velocity command signal from the potentiometers 204, or 205 is greater in magnitude than the feedback signal from the signal analyser 120, the trolley will continue to move toward the target ship until it engages the receiving head of the ship.

The output signal from the velocity comparative amplifier 163 is supplied via lead 188, through resistor 189 to the push-pull amplifier 134.

During both the velocity mode of operation of the system and the position mode of operation, the velocity feedback signal from the analyser 120 is supplied to the rapid transfer amplifier 160. This signal, during both of these modes of operation of the system, is a limiting signal supplied from the rapid transfer amplifier 160 via lead 185, resistor 186 to the velocity comparative amplifier 163. If, for any reason, the winch velocity should reach that maximum preset velocity, 450 feet per minute in the example described above, this feedback signal from the rapid transfer amplifier 160 will be operative to prevent the winch velocity from exceeding this value.

Signal analyser circuit

As indicated in FIGURE 5, the velocity analyser section 250 of the signal analyser 120 operates with two input signals, $V_i$ and $V_o$ from the inhaul and outhaul tachometers 112, 113 respectively. Referring now to FIGURE 6, the $V_i$ input signal is fed via lead 251, through resistor 252 and lead 253 to a magnetic amplifier 254. The $V_o$ input signal is fed via lead 259, resistor 260, and lead 253 into amplifier 254. The output signal from this amplifier 254, which is equal to $$\frac{V_i + V_o}{2}$$

or $V_r$, is fed via lead 255 through a resistor 261, to a winding 266 of a second magnetic amplifier 256. The signal $V_i$ in lead 251 is also fed via lead 257, through a resistor 264, to a second winding 258 of amplifier 256. The output of amplifier 256 is fed via lead 262 to the output post 263 of the signal analyser. The signal at the post 263 is equal to $V_r - V_i$ or $V_t/_r$. Thus, the velocity analyser section of the panel, operating with the $V_i$ and $V_o$ inputs, supplied $V_i$ and $V_t/_r$ to the output posts 265 and 263 respectively.

The position analyser circuit 268 of the signal analyser panel 120 is very nearly identical to the velocity analyser circuit 250. In this section, the input signals are $X_i$ and $X_o$ from the inhaul potentiometer 114 and the outhaul potentiometer 115 respectively. The $X_i$ signal is fed via lead 270 through resistor 271 and lead 272 to the winding 273 of the magnetic amplifier 275. The input signal $X_o$ is fed via lead 280 through resistor 281 and lead 272 to the winding 273 of the magnetic amplifier 275. The output signal from the amplifier 275, representing $X_r$ or $$\frac{X_i + X_o}{2}$$

is fed via lead 290, through resistor 291 to a winding 292 of a second magnetic amplifier 295. A second input signal $X_i$ is fed via lead 296, through resistor 297, to a second winding 298 of the amplifier 295. The output from this second amplifier 295 is fed via lead 299 to the output post 293 of the signal analyser 120. This latter signal is equal to $X_t/_r$ or, otherwise expressed, $X_r - X_i$. Thus, the position analyser circuit is operative, operating with $X_i$ and $X_o$ as the inputs, to supply $X_i$ and $X_t/_r$ at the output posts 294 and 293 respectively.

Position mode of control

In the position mode of control, a command signal, indicative of the position at which the trolley is to stop, is supplied from one of a pair of potentiometers 210, 211. These signals are supplied as command signals to the position amplifier 212. Feedback to the amplifier 212 is supplied via lead 217 through either the contact SR2–11 or SR2–12, depending upon whether the trolley is moving toward the receiver ship or the supply ship. The output from this amplifier 212, the magnitude of which is representative of the difference between the actual position of the trolley and the stop position of the trolley, is supplied via lead 220 through resistor 300 to a second position amplifier 221. From the second amplifier 221, the position feedback signal is supplied via lead 222, through a polarity reversing circuit 223, via lead 224 (assuming trolley is moving from receiver ship to supply ship and direction relay SR2 de-energized) through the normally open contact SR5–1 of velocity mode relay SR5, through normally closed contact SR14–2, resistor 225, and lead 140 to the winding 226 of the push-pull amplifier 134. This winding is grounded via lead 227 and the polarity reversing circuit 223.

When the trolley reaches the position set into the control knob of the potentiometer 210 or 211 (depending upon the direction of trolley movement) the position error signal will diminish to zero with the result that there will be no tension command signal output from the push-pull amplifier 134. The only input signal to the pump amplifier 74 at this time will be the tension error signal from the transducer potentiometers 60, 61. These latter error signals are then operative to hold the trolley at the position set into the system by the knobs of the potentiometers 210, 211.

Operation

To operate this transfer system, the high line 14 (FIGURE 2) is first rigged between the supply ship 11 and receiver ship 12 in the conventional manner. The inhaul winch 31 and outhaul winch 33 are then actuated so as to pay out cable, the ends of which are attached to the trolley 13 after having passed around the supply ship pulley 29 and receiver ship pulley 32.

To pay out this cable 30 from these two winches, the power on switch 80 (FIGURE 7) to the winch control circuit is first manually closed by the system operator. Actuation of this switch 80 completes a circuit to a power supply 54 which in turn supplies 18 volt D.C. power or 115 volt, 400 cycle A.C. power to the control circuitry taps. The operator then actuates the electric motors 44, 45 (FIGURES 4 and 8) by manually actuating the motor start switches 65, 93. These electric motors 44, 45 drive the fluid pumps 42, 43 respectively. The pumps 42, 43 act as fluid source to the hydraulic motors 40, 41 which in turn drive the inhaul winch 31 and the outhaul winch 33. The position of a pump hanger (not shown) in each of the pumps determines whether there is any fluid flow between the pumps 42, 43 and the motors 40, 41. When the hanger is in a centered position, no fluid is supplied to the motors 40, 41. When the hanger is moved by the control system and specifically by the servo 76, 76–0 (FIGURE 5) in one direction, it causes the hydraulic motor to rotate in a clockwise direction and when moved in the opposite direction from a centered position, it causes the hydraulic motors to be rotated in a counterclockwise direction.

Manual speed control mode

With the control circuit power on and the electric pump motors 44, 45 rotating, the operator is able to pay out or take in line by manually moving the manual speed handles 70, 70–0 in either of two directions from a centered position. The position of these handles determines the magnitude and polarity of a D.C. current supplied from a manual speed control potentiometer 71, 71–0 to a pump amplifier 74, 74–0. The output signal from this pump amplifier 74, 74–0 is supplied as an input to the servo valve 76, 76–0 of the pumps 42, 43. A pump hanger position feedback signal is returned through a feedback loop from the pump potentiometers 78, 78–0 to the pump amplifier 74, 74–0. If the pump hanger is in the position dictated by the position of the manual speed control handle 70, 70–0, the command signal from the manual speed control potentiometers 71, 71–0 is cancelled by the feedback signals from the pump potentiometers 78, 78–0 and there is no change in the pump hanger position. However, if the pump hanger is not in the position dictated by the control handles 70, 70–0, the output signal from the pump amplifier will actuate the servo valves 76, 76–0 of pumps 42, 43 and cause the hanger to be moved to the position commanded by the potentiometer 71, 71–0. In this way, by simply controlling the handles 70, 70–0, the seamen may pay out or take in line for rigging the trolley to the transfer cable 30.

Manual tension control mode

With transfer cable 30 rigged between the ships, the operator may move the trolley between the ships in either manual tension or automatic control. In manual tension control, a predetermined tension is maintained on the cable 30. With this tension on the cable 30, the operator increases the tension in the cable at one or the other winch and in so doing causes the trolley 13 to be moved toward that winch.

As an example, assume that on thousand pounds of tension is being maintained on the cable adjacent both of the winches 31, 33. If the operator manually moves the handle 85–0 (FIGURE 5) so as to increase the tension at the outhaul winch 33 to fifteen hundred pounds of tension, the imbalance causes the cable to be collected upon the outhaul winch and payed out from the inhaul winch.

The tension adjacent each of the winches is measured by the transducers 34, 35. To put the system into manual tension control, the operator manually actuates the tension switch 79 (FIGURE 7) causing the relay SR–1 to be energized. This results in the manual tension control potentiometers 86, 86–0 being placed in the control circuit to the pump amplifier 74, 74–0 and the manual speed control potentiometers 71, 71–0 being taken out of the circuit. Additionally, this puts the tension measuring transducers 34, 35 into control circuit in the form of a feedback loop.

In manual tension, the command signal, which dictates the amount of preset tension to be maintained on the cable, is supplied from the potentiometers 100, 100–0 to the tension amplifiers 87, 87–0. These potentiometers are preset by the system operator at his control console.

The tension amplifier 87, 87–0 output signal is supplied to a tension compensation amplifier 95, 95–0 and the output from this latter amplifier is supplied to the pump amplifier 74, 74–0. Pump amplifier 74, 74–0 in turn controls the pump servo valve 76, 76–0. Tension in the cable is measured by the transducer 34, 35 which supplies a feedback signal from its potentiometer 60, 61 to the tension amplifier 87, 87–0. If the tension in the cable, as measured by the transducer 34, 35 is equal to the tension command signal of the potentiometer 100, 100–0, the tension feedback signal will oppose and cancel the command signal from the tension setting potentiometer 100, 100–0. On the other hand, if the two do not match as, for example, if the tension setting potentiometer 100, 100–0 generates a command for one thousand pounds of tension and the measured tension at the transducer 34, 35 is five hundred pounds, the feedback signal will not cancel the command signal and, therefore, the input to the tension amplifier 87, 87–0 will result in a pump servo valve movement operative to increase the fluid flow to the winch motor 40, 41, causing the winch to take in line so as to increase the tension.

The signal which effects a trolley movement in tension control mode of operation and an imbalance in the tension measured at the two transducers 34, 35, is supplied to the control circuit from the manual tension control potentiometers 86, 86–0. This latter input signal is supplied upon the operator's manual displacement of one of the control handles 85, 85–0. Movement of either of these handles results in an output signal from the potentiometer 86, 86–0, being supplied to the tension amplifier 87, 87–0 in addition to the tension setting signal from potentiometer 100, 100–0 and the tension feedback signal from the transducer potentiometers 60, 61. The signal from the manual tension control potentiometers 86, 86–0 increase the tension command signals formerly provided by potentiometers 100, 100–0 with the result that the cable tension is increased and the cable moved toward the transducer measuring the greater tension.

Automatic control

In automatic control, the trolley is moved from one ship toward the other ship in first, rapid traverse mode of control, and then in either velocity mode of control or position mode of control. If the system switches from rapid traverse to velocity control, the trolley moves at a fast rate of speed until it reaches a preset position close to the target ship at which time it switches to a slow speed and continues to move toward the target ship until it engages the target ship's receiving head. On the other hand, if it switches into position control, when the trolley reaches the preset close position to the target ship, it continues from the preset position at a slow velocity until it reaches a second preset position (as, for example, five feet from the target ship) at which it stops and is held irrespective of all ship movements.

To place the system in automatic control, the operator manually closes the automatic control switch 125 at his control console after having closed the tension control switch 79 and power on switch 83. He also must decide whether the control is to switch into either position or velocity mode of control after completing the rapid traverse and accordingly moves the position velocity switch 207 to the chosen mode. Assuming he selects position control, he leaves the switch 207 open and the velocity control relay SR5 de-energized. He also must select the direction of trolley movement by the setting of the switch 128. Assuming the trolley is to move from the supply ship to the receiver ship, he closes the switch 128 so as to energize the relay SR2. The system is then ready to move out under automatic control upon closing of a rapid traverse start switch 127.

In the automatic mode of control, three signals are supplied to the tension amplifiers 87, 87-0 of both winch control circuits; the first is the tension command signal from the tension setting potentiometers 100, 100-0; the second is the feedback signal from the tension transducers 34, 35 operative to maintain the tension in the lines at that which is preset by the potentiometers 100, 100-0; and the third is a tension command signal from the push-pull amplifier 134 which transmits a signal of equal magnitude but opposite polarity to each of the tension amplifiers 87, 87-0. In the absence of any other signals to the tension amplifiers 87, 87-0, this latter signal from the push-pull amplifier 134 is operative to drive the two winches at the same speed but in opposite directions.

*Rapid traverse control*

Actuation of the automatic control relay SR3 upon closing of switch 125 causes the push-pull amplifier 134 to be inserted into the control circuit to the pump amplifier 74, 74-0 and the manual tension control potentiometers 86, 86-0 to be taken out of the circuit. Simultaneously, contact SR3-5 is closed, completing a circuit to the relay SR14 via normally open contacts SR6-3 of relay SR6 and SR3-5 of relay SR3. The relay SR6, which is a position control relay, is energized so long as the trolley is more than the rapid traverse drop out distance (approximately 20 feet) from the target ship.

Upon energization of the relay SR14, a circuit is completed from a power source 136 (FIGURE 5) to the push-pull amplifier 134. This circuit supplies an 18 volt signal to the push-pull amplifier 134, operative to effect movement of the trolley away from the sending ship at the maximum winch speed as determined by one of a pair of voltage limiters 146, 155.

During automatic control, winch velocity feedback signals are supplied to the signal analyser 120 from the pair of tachometers 112, 113. Additionally, position signals are supplied to the signal analyser 120 from a pair of potentiometers 114, 115. A velocity feedback signal is supplied from the signal analyser 120 to the rapid traverse amplifier 160. This latter circuit between the signal analyser 120 and the rapid traverse amplifier 160 includes a gating device 165 operative to pass only that signal from the faster operating of the two winches. In effect, this gating device insures that one of the two winches operates at its maximum preset operating speed during rapid traverse. To accomplish this, the gating device operates to pass only the velocity signal from the faster operating of the two winches to the rapid traverse amplifier 160 so that only this signal is used as the feedback during the rapid traverse mode of transfer. This insures that no winch is ever caused to overspeed and that the transfer occurs as quickly as possible within the physical limits of the winches.

The output signal from the rapid traverse amplifier 160 is supplied to a velocity comparative amplifier 163, the output of which is the velocity feedback signal to the push-pull amplifier 134. Thus, the trolley will continue to accelerate away from the sending ship until one winch reaches a maximum operating velocity at which time the feedback signal from one of the tachometers 112, 113 will cancel the command acceleration signal from the power source 136 with the result that the system will then maintain one of the winches at this maximum preset velocity.

When the trolley nears the target ship, the relay SR6 is de-energized as a result of the position error signal diminishing to the drop out voltage of the relay. This causes the contact SR6-3 (FIGURE 7) to open and de-energize the relay SR14, which in turn results in the acceleration signal from the power source 136 being dropped from the control circuit as a result of the contact SR14-1 opening.

*Velocity control*

If the position velocity switch 207 (FIGURE 7) has been preset for velocity control, the velocity control relay SR5 is energized. Thus, when the relay SR6 drops out or is de-energized upon the trolley nearing the target ship, a velocity feedback circuit from the signal analyser 120 to the velocity comparative amplifier 163 is completed through the normally closed contact SR6-2 and the normally open contact SR5-2. At this time, the velocity command signal is supplied to the velocity comparative amplifier 163 from one of a pair of potentiometers 204, 205, depending upon the direction of trolley movement. The output signal from the comparative amplifier 163, which represents the difference between the command signal from one of the potentiometers 204, 205 and the feedback signal from the signal analyser 120, is fed as an input into the push-pull amplifier 134. This latter signal is operative to move the trolley from the rapid traverse drop out position (approximately 20 feet from the target ship) at a slow speed until the trolley engages the receiving head of the target ship.

*Position control*

If the position velocity switch 207 had been set for position control, and thus, left open so that the relay SR5 remained de-energized, the control system would transfer from rapid traverse control into position control when the trolley reached the rapid traverse drop out position approximately 20 feet from the target ship. In this mode of control, the command signal is supplied from one of a pair of potentiometers 210, 211, depending upon the direction of trolley movement, to a position amplifier 212. The position feedback signal, $X_i$ or $X_{t/r}$, depending upon direction of trolley movement, is also supplied to the position amplifier 212. The output of the position amplifier 120, which represents the difference between the position command and the position feedback, is fed into a second amplifier 221, and subsequently to the push-pull amplifier 134 via the normally closed contact SR5-1 of the velocity control relay SR5 and the normally closed contact SR14-2 of the rapid traverse relay SR14.

As indicated above, so long as the position error signal from amplifier 221 is above a preset value, the rapid traverse drop out relay SR6 remains energized. When, however, the signal decreases to a preset minimum, indicating the trolley is a preset distance from the target ship as, for example, 20 feet, the rapid traverse drop out relay SR6 is de-energized.

Once the trolley reaches the position dictated by the position potentiometers 210, 211, the position control circuit is operative to hold the trolley at this position. If the target ship moves away from this position, the feedback signal from signal analyser 120 will indicate this movement to the position amplifier 212 and an error signal will be generated by this amplifier 212. This error signal will in turn be supplied to the push-pull amplifier and subsequently to the pump amplifier 74, 74-0 of the inhaul and outhaul pump control circuit.

For the benefit of those who desire to make and usethe system heretofore described, a list of electrical component values is as follows:

ELECTRICAL COMPONENTS

| No. | Description | Value |
|---|---|---|
| 60 | Transducer Potentiometer. | 15" Rectilinear Potentiometer. |
| 61 | ----do---- | Do. |
| 71 | Speed Control Potentiometer. | 10K Ohms Linear Potentiometer. |
| 74 | Magnetic Amplifier | 400 cycles with two 50K Ohms windings (Model 0505, Dennison Engr. Divn. of American Brake Shoe Co.). |
| 86 | Tension Control Potentiometer. | 10K Ohms. |
| 87 | Magnetic Amplifier | 400 cycles with one 10K and one 100K winding (Model 1001, Dennison Engr.). |
| 90 | Resistor | 4.7K Ohms. |
| 95 | Magnetic Amplifier | 40 Ohms. |
| 97 | Capacitor | 47/35 Condenser. |
| 98 | ----do---- | Do. |
| 99 | Resistor | 1.5K Ohms. |
| 100 | Tension Setting Potentiometer. | 25K Ohms. |
| 103 | Resistor | 15K Ohms. |
| 106 | ----do---- | 10K Ohms. |
| 106-0 | ----do---- | 10K Ohms. |
| 112 | Tachometer | 45 v./1,000 r.p.m. |
| 113 | ----do---- | 45 v./1,000 r.p.m. |
| 114 | Potentiometer | 10K Ohms. |
| 115 | ----do---- | Do. |
| 134 | Magnetic Amplifier | 400 cycle with two 50K windings (Model 0505, Dennison Engr.). |
| 138 | Resistor | 10K Ohms. |
| 141 | ----do---- | 3.9K Ohms. |
| 142 | ----do---- | 3.9K Ohms. |
| 147 | Potentiometer | 10K Ohms. |
| 148 | ----do---- | 10K Ohms. |
| 149 | Diode | IN 2091. |
| 150 | ----do---- | IN 2091. |
| 158 | Resistor | 1K Ohms. |
| 159 | ----do---- | 1K Ohms. |
| 160 | Magnetic Amplifier | 50K Ohms. |
| 163 | ----do---- | 400 cycle with two 50K windings (Model 0505, Dennison Engr.) |
| 169 | Diode | IN 2091. |
| 170 | ----do---- | IN 2091. |
| 173 | ----do---- | IN 2091. |
| 174 | ----do---- | IN 2091. |
| 176 | ----do---- | IN 2091. |
| 177 | Resistor | 1.5K Ohms. |
| 178 | ----do---- | Do. |
| 179 | Diode | IN 2091. |
| 180 | Potentiometer | 10K Ohms. |
| 181 | ----do---- | Do. |
| 186 | Resistor | 3.3K Ohms. |
| 189 | ----do---- | 6.8K Ohms. |
| 192 | ----do---- | Do. |
| 193 | ----do---- | Do. |
| 195 | ----do---- | 2.2K Ohms |
| 196 | Capacitor | 50/25 capacitor. |
| 204 | Potentiometer | 10K Ohms. |
| 205 | ----do---- | Do. |
| 210 | ----do---- | Do. |
| 211 | ----do---- | Do. |
| 212 | Magnetic Amplifier | 400 cycle with one 10K and one 100K winding (Model 1001, Dennison Engr.). |
| 221 | ----do---- | Do. |
| 225 | Resistor | 5.6K Ohms. |
| 252 | ----do---- | 82K Ohms. |
| 254 | Magnetic Amplifier | 400 cycle with two 50K Ohm windings (Model 0505, Dennison Engr.). |
| 256 | ----do---- | Do. |
| 260 | Resistor | 82K Ohms. |
| 261 | ----do---- | 39K Ohms. |
| 264 | ----do---- | Do. |
| 271 | ----do---- | 68K Ohms. |
| 275 | Magnetic Amplifier | 400 cycle with two 50K Ohm windings (Model 0505, Dennison Engr.). |
| 281 | Resistor | 68K Ohms. |
| 291 | ----do---- | 39K Ohms. |
| 295 | Magnetic Amplifier | 400 cycle with two 50K Ohm windings (Model 0505, Dennison Engr.). |
| 297 | Resistor | 39K Ohms. |
| 300 | ----do---- | 10K Ohms. |
| 400 | ----do---- | 6.8K Ohms. |
| 433 | ----do---- | 5.6K Ohms. |

While only one specific preferred embodiment of the invention has been illustrated and described herein, those skilled in that art to which this invention pertains will readily appreciate that numerous changes and modifications of this invention may be made without departing from the spirit of the invention. Therefore, we do not intend to be limited except by the appended claims.

Having described our invention, we claim:

1. The method of transferring a trolley between two moving ships at sea, one of said ships being a supply ship and the other a receiver ship, said trolley being attached to a transfer cable which extends from an inhaul winch on the supply ship, to and around a pulley on the receiver ship and back to an outhaul winch on the supply ship, said method comprising,
   operating said winches at speeds and in directions operable to move the trolley from the supply ship to the receiver ship while maintaining a preset tension on said transfer cable,
   measuring the velocity of said trolley relative to said receiver ship, and
   using said measured velocity to control the speed and direction of operation of said winches whereby said trolley movement is controlled relative to said receiver ship.

2. The method of controlling a trolley during transfer between a moving supply ship and a moving receiver ship at sea, said trolley being attached to a transfer cable which extends from an inhaul winch through a first tension sensing cell on the supply ship, over a pulley on the receiver ship and back through a second tension sensing cell to an outhaul winch on the supply ship, said method comprising,
   controlling rotation of said winches from a winch control system having a tension command input,
   measuring the dynamic tension in the cable at said tension sensing cells whereby the inertia of the winches is not reflected in said tension measurements,
   converting said tension measurements into feedback signals to the winch control system, and
   driving said winches by means of tension error signals from said winch control system whereby said winches are operable to maintain a preset tension on said cable irrespective of all ship movement.

3. The method of claim 2 which further comprises the step of storing a reserve supply of cable between said winches, said reserve being sufficient to accommodate rapid relative movement of said ships during a time interval between initiation of a movement and response of said winches to the resulting change of tension in said cable.

4. The method of transferring a trolley between two moving ships at sea, one of said ships being a supply ship and the other a receiver ship, said trolley being attached to a transfer cable which extends from an inhaul winch on the supply ship, to and around a pulley on the receiver ship and back to an outhaul winch on the supply ship, said method comprising,
   operating said winches at speeds and in directions operable to move the trolley from one ship to the other ship while maintaining a preset tension of said transfer cable,
   measuring the velocity of said trolley relative to said other ship, and
   using said measured velocity to control the speed and direction of operation of said winches whereby said trolley movement is controlled relative to said other ship.

5. The method of transferring a trolley between two moving ships at sea, one of said ships being a supply ship and the other a receiver ship, said trolley being attached to a transfer cable which extends from an inhaul winch on the supply ship, to and around a pulley on the receiver ship and back to an outhaul winch on the supply ship, said cable passing through at least one tension measuring cell on said supply ship, said method comprising,
   measuring the tension of the cable at said tension measuring cell,
   using said tension measurement to control said winches so as to maintain a preset tension on said cable,
   operating said winches at speeds and in directions to move the trolley from one ship to the other ship while maintaining said preset tension on said transfer cable,
   determining the position of said trolley relative to said other ship during transfer of said trolley toward said other ship, and using said position determination to control the speed and direction of operation of said winches whereby said trolley is controlled relative to said other ship toward which it is moving.

6. The method of claim 5 which further comprises the step of storing a reserve supply of cable between said winches, said reserve being sufficient to accommodate rapid relative movements of said ships during a time interval between initiation of a movement and response of said winches to the resulting change of tension.

7. The method of transferring a trolley between two moving ships at sea, one of said ships being a supply ship and the other a receiver ship, said trolley being attached to a transfer cable which extends from an inhaul winch on the supply ship, to and around a pulley on the receiver ship, and back to an outhaul winch on the supply ship, said method comprising, maintaining a preset tension on said transfer cable throughout transfer from one ship to the other target ship, rotating said winches at speeds such that said trolley is moved for at least a first portion of said transfer at rapid traverse rate of speed, during which at least one of said two winches is operating at its maximum preset speed while while the other winch varies speed to maintain the preset tension as the ships move relative to each other, determining the position of said trolley relative to the said target ship during transfer of said trolley toward said target ship, and using said position determination during a second portion of said transfer to control the speed and direction of operation of said winches whereby the position of said trolley is controlled relative to said target ship.

8. The method of transferring a trolley between two moving ships at sea, one of said ships being a supply ship and the other a receiver ship, said trolley being attached to a transfer cable which extends from an inhaul winch on the supply ship, to and around a pulley on the receiver ship, and back to an outhaul winch on the supply ship, said method comprising, maintaining a preset tension on said transfer cable throughout transfer from one ship to the other target ship, moving said trolley during a first portion of the transfer between said ships at rapid traverse rate of speed during which at least one of said two winches is operating at its maximum preset speed while the other winch varies speed to maintain the preset tension as the ships move relative to each other, moving said trolley during a second portion of said transfer at a slower rate of speed, determining the position of said trolley relative to said target ship during transfer of said trolley toward said target ship, and using said position determination during another portion of said transfer to control the speed and direction of operation of said winches whereby the position of said trolley is controlled relative to the target ship.

9. Apparatus for transferring a trolley between the moving ships at sea, said apparatus comprising,
a pair of winches,
a transfer cable extending between said winches,
a trolley attached to said cable
means for operating said winches at speeds and in directions operable to move the trolley from the supply ship to the receiver ship while maintaining a preset tension on said transfer cable,
means for detecting the velocity of said trolley relative to said receiver ship, and
means for using said detected velocity to control the speed and direction of operation of said winches whereby said trolley movement is controlled relative to said receiver ship.

10. Apparatus for transferring a trolley between two moving ships at sea, one of said ships being a supply ship and the other a receiver ship, said apparatus comprising,
an inhaul winch and an outhaul winch on the supply ship, a transfer cable attached to one end to said inhaul winch and at the opposite end to said outhaul winch, said cable having one stretch extending from said supply ship to said receiver ship and another stretch extending from said receiver ship back to said supply ship, a trolley attached to said cable,
means for operating said winches at speeds and in directions operable to move the trolley from the supply ship to the receiver ship,
means for detecting the velocity of said trolley relative to said receiver ship, and
means for using said detected velocity to control the speed and direction of operation of said winches whereby said trolley movement is controlled relative to said receiver ship.

11. Apparatus for transferring a trolley between two moving ships at sea, one of said ships being a supply ship and the other a receiver ship, said apparatus comprising,
an inhaul winch and an outhaul winch on the supply ship, a transfer cable attached at one end to said inhaul winch and at the opposite end to said outhaul winch, said cable having one stretch extending from said supply ship to said receiver ship and another stretch extending from said receiver ship back to said supply ship, both of said stretches passing through a tension measuring cell adjacent one of said winches, a trolley attached to said cable,
a drive system including a hydraulic pump and motor for each of said winches,
means for controlling both of said winch drive systems including an electrical control circuit having an electrical tension command input,
means for converting a tension measurement at both of said cells into an electrical feedback signal to said control circuit, and
means for operating both of said hydraulic pumps by means of tension error signals from said winch control circuit.

12. The trolley transfer apparatus of claim 11 wherein each of said tension measuring cells includes means for storing a reservoir of cable, said cell reservoirs having sufficient capacity to accommodate rapid relative movements between said ships during a time interval between initiation of a movement and response of said winches to the resulting change of tension in said cable.

13. Apparatus for transferring a trolley between two moving ships at sea, said apparatus comprising,
a pair of winches,
a cable extending between said winches,
a trolley attached to said cable,
means for operating said winches at speeds and in directions operable to move the trolley from one ship to the other ship while maintaining a preset tension on said transfer cable,
means for measuring the velocity of said trolley relative to said other ship, and
means for using said measured velocity to control the speed and direction of operation of said winches whereby said trolley movement is controlled relative to said other ship.

14. Apparatus for transferring a trolley between two moving ships at sea, said apparatus comprising,
a pair of winches,
a cable extending between said winches,
a trolley attached to said cable,
means for maintaining a preset tension on said transfer cable throughout said transfer, and control means for operating said winches at speeds such that said trolley is moved for at least a portion of said transfer at a rapid traverse rate of speed, said control means being operable when said winches are operating at a rapid traverse rate of speed to operate one of said two winches at its maximum preset speed while the other winch varies speed to maintain the preset tension as the ships move relative to each other and to slow said one winch only when maintaining the preset tension in the cable requires said other winch to exceed its maximum preset speed.

15. Apparatus for transferring a trolley between two moving ships at sea, said apparatus comprising,
   a pair of winches,
   a cable extending between said winches,
   a trolley attached to said cable,
   means for maintaining a preset tension on said transfer cable throughout said transfer,
   control means for moving said trolley during a first portion of the transfer between said ships at a rapid traverse rate of speed said control means being operable when operating said winches at the rapid traverse rate to operate one of said two winches at its maximum preset speed while the other winch varies speed to maintain the preset tension as the ships move relative to each other and to slow said one winch only when maintaining said preset tension requires said other winch to exceed its preset maximum speed, and
   means responsive to said trolley reaching a predetermined position for slowing the movement of said trolley during a second portion of said transfer to a slower rate of transfer.

16. Apparatus for transferring a trolley between two moving ships at sea, one of said ships being a supply ship and the other a receiver ship, said apparatus including an inhaul winch and an outhaul winch on the supply ship, a transfer cable attached at one end to said inhaul winch and at the opposite end to said outhaul winch, said cable having one stretch extending from said supply ship to said receiver ship and another stretch extending from said receiver ship to said supply ship, a trolley attached to said cable, the improvement which comprises a tension measuring cell through which at least one of said stretches of cable passes, said cell comprising,
   a housing,
   a pair of pulleys rotatable within support blocks, said blocks being attached to opposite sides of said housing,
   a third pulley mounted on a movable support block, said movable block being slidable within said housing,
   a cable adapted to be extended beneath one of said pair of pulleys, over said third pulley, and beneath the other of said pair of pulleys,
   a compression spring located within said housing for biasing said movable block toward one end of said housing,
   a hydraulic dashpot including a piston and cylinder located within said housing, said cylinder being fixed to said housing and said piston being attached to said movable block whereby said dashpot is operable to dampen resonant vibration of said spring and movable block, and
   means for converting linear movement of said movable block relative to said housing into an electrical signal representative of tension in said cable.

17. Apparatus for transferring a trolley between two moving ships at sea, one of said ships being a supply ship and the other a receiver ship, said apparatus including an inhaul winch and an outhaul winch on the supply ship, a transfer cable attached at one end to said inhaul winch and at the opposite end to said outhaul winch, said cable having one stretch extending from said supply ship to said receiver ship and another stretch extending from said receiver ship to said supply ship, a trolley attached to said cable, the improvement which comprises a tension measuring cell through which at least one of said stretches of cable passes, said cell comprising,
   a housing,
   a pulley mounted on a movable support block, said block being slidable relative to said housing,
   a cable adapted to be passed through said pulley,
   a spring for biasing said movable block toward one position,
   a dashpot including a piston member and a cylinder member, one of said members being attached to said housing and the other said member being attached to said movable block whereby said dashpot is operable to dampen resonant vibration of said spring and movable block, and
   means for converting linear movement of said movable block relative to said housing into an electrical signal representative of tension in said cable.

18. Apparatus for transferring a trolley between two moving ships at sea, one of said ships being a supply ship and the other a receiver ship, said apparatus including an inhaul winch and an outhaul winch on the supply ship, a transfer cable attached at one end to said inhaul winch and at the opposite end to said outhaul winch, said cable having one stretch extending from said supply ship to said receiver ship and another stretch extending from said receiver ship to said supply ship, a trolley attached to said cable, the improvement which comprises a tension measuring cell through which at least one of said stretches of cable passes, said cell comprising,
   a pulley mounted on a movable support block,
   a cable adapted to be passed through said pulley,
   a resilient energy storing spring for biasing said movable block toward one position, and
   means for converting movement of said movable block into an electrical signal representative of tension in said cable.

19. Apparatus for transferring a trolley between two moving ships at sea, one of said ships being a supply ship and the other a receiver ship, said apparatus including an inhaul winch and an outhaul winch on the supply ship, a transfer cable attached at one end to said inhaul winch and at the opposite end to said outhaul winch, said cable having one stretch extending from said supply ship to said receiver ship and another stretch extending from said receiver ship to said supply ship, a trolley attached to said cable, the improvement which comprises a tension measuring cell through which at least one of said stretches of cable passes, said cell comprising,
   a supporting housing,
   a pulley mounted on a movable support block, said block being movable relative to said housing,
   a cable adapted to be passed through said pulley,
   a resilient cable storing means for biasing said movable block toward one position,
   dashpot means operable to dampen resonant vibration of said resilient means and movable block, and
   means for converting movement of said movable block relative to said housing into an electrical signal representative of the tension in said cable.

20. Apparatus for transferring a trolley between two moving ships at sea, said apparatus comprising,
   a pair of winches,
   a cable extending between said winches,
   a trolley attached to said cable,
   means including a winch control having a tension command input for operating at least one of said winches,
   means for measuring the tension in said cable,
   means for converting said tension measurement into a feedback signal to said winch control,
   means for driving at least one winch by means of a tension error signal from said winch control, and
   energy storage means operable to provide said winch operating means with a time lag during which to react to a change in tension in said cable.

21. Apparatus for transferring a trolley between two moving ships at sea, said apparatus comprising,
- a pair of winches,
- a cable extending between said winches,
- a trolley attached to said cable,
- drive means including a motor for operating each of said winches,
- means for controlling each of said drive means from a winch control system having a tension command input,
- means for measuring the tension in the cable adjacent both of said winches,
- means for converting said tension measurements into feedback signals to each of said winch control systems,
- means for operating each of said winch drive means by a tension error signal from said winch control system, and
- energy storage means operable to provide said drive means with a time lag during which to react to a change in tension in said cable.

22. Apparatus for transferring a trolley between two moving ships at sea, one of said ships being a supply ship and the other a receiver ship, said apparatus comprising,
- an inhaul winch and an outhaul winch on the supply ship, a transfer cable attached at one end to said inhaul winch and at the opposite end to said outhaul winch, said cable having one length extending from said supply ship to said receiver ship and another length extending from said receiver ship back to said supply ship, a trolley attached to said cable,
- a drive system including a hydraulic pump and motor for each of said winches,
- means for controlling at least one of said winch drive systems including an electrical control circuit having an electrical tension command input,
- means for measuring the tension in the cable adjacent one of said winches,
- means for converting said tension measurement into an electrical feedback signal to said control circuit, and
- means for operating one winch drive system by means of a tension error signal from said winch control circuit, and
- energy storage means operable to provide said drive system with a time lag during which to react to a change in tension in said cable.

23. Apparatus for transferring a trolley between two moving ships at sea, said apparatus comprising,
- a pair of winches,
- a cable extending between said winches,
- a trolley attached to said cable,
- a drive system for operating each of said winches,
- means for maintaining a preset tension on said cable including means for measuring the tension in the cable, and means for converting said tension measurement into a feedback signal to the drive system of at least one of said winches,
- a resilient cable storage means including a spring operable to provide said drive system with a time lag during which to react to a change in tension in said cable, and
- dashpot means associated with said resilient cable storage means operable to dampen resonant vibration of said trolley cable and said spring.

24. Apparatus for transferring a trolley between two moving ships at sea, said apparatus comprising,
- a pair of winches,
- a cable extending between said winches,
- a trolley attached to said cable,
- a drive system for operating each of said winches,
- means including a transducer for maintaining a preset tension on said cable, said transducer comprising a housing, a pair of pulleys rotatable within support blocks, said blocks being attached to opposite sides of said housing, a third pulley mounted on a movable support block, said movable support block being movable relative to said housing, said cable extending beneath one of said pair of pulleys, over said third pulley, and beneath the other of said pair of pulleys, a spring located within said housing for biasing said movable block toward one end position, a dashpot including a piston and cylinder located within said housing, said dashpot being operable to dampen resonant vibration of said spring and movable block, and means for converting movement of said movable block relative to said housing into an electrical signal representative of tension in said cable.

25. The method of controlling a trolley during transfer between a moving supply ship and a moving receiver ship at sea, said trolley being attached to a transfer cable which extends from an inhaul winch on the supply ship, over a pulley on the receiver ship and back to an outhaul winch on the supply ship, said method comprising,
- controlling rotation of at least one of said winches from a winch control system having a tension command input,
- measuring the dynamic tension in the cable adjacent said one winch, whereby the inertia of the winch is not reflected in said tension measurement,
- converting said tension measurement into a feedback signal to the winch control system, and
- driving said one winch by means of a tension error signal from said winch control system whereby said winches are operable to maintain a preset tension on said cable irrespective of all ship movement.

26. Apparatus for transferring a trolley between two moving ships at sea, one of said ships being a supply ship and the other a receiver ship, said apparatus including an inhaul winch and an outhaul winch on the supply ship, a transfer cable attached at one end to said inhaul winch and at the opposite end to said outhaul winch, said cable having one stretch extending from said supply ship to said receiver ship and another stretch extending from said receiver ship to said supply ship, a trolley attached to said cable, the improvement which comprises
- a pair of tension measuring transducers, each of said transducers being located adjacent one of said winches and having one of said stretches of cable passing therethrough, each of said tension measuring transducers including a pulley mounted on a movable support block,
- said stretches of cable passing through each of said transducers being passed around said pulley of said transducer,
- a resilient energy storing spring for biasing each of said movable blocks toward one position, and
- an electrical signal generator associated with each of said transducers and operative in response to movement of each of said movable blocks to generate an electrical control signal having a characteristic representative of tension in said cable.

References Cited
UNITED STATES PATENTS

| | | | |
|---|---|---|---|
| 424,833 | 4/1890 | Stut | 104—196 |
| 709,916 | 9/1902 | Leonard | 254—172 X |
| 2,443,028 | 6/1948 | Edwards | 254—172 |
| 2,609,181 | 9/1952 | Jaeschke | 254—172 |
| 3,151,507 | 10/1964 | Canova et al. | |
| 3,217,660 | 11/1965 | Shillinger | 104—114 |

ARTHUR L. LA POINT, *Primary Examiner.*

EUGENE G. BOTZ, *Examiner.*

J. E. BABER, *Assistant Examiner.*